United States Patent [19]

Fendya et al.

[11] Patent Number: 5,679,249
[45] Date of Patent: Oct. 21, 1997

[54] DYNAMIC FILTER SYSTEM

[75] Inventors: Thomas J. Fendya, Homer; Mark F. Hurwitz, Ithaca; Edward M. Musto, Homer; John D. Miller, Ithaca; John E. Ryan, Jr., Cortland, all of N.Y.

[73] Assignee: PALL Corporation, East Hills, N.Y.

[21] Appl. No.: 80,215

[22] Filed: Jun. 23, 1993

Related U.S. Application Data

[63] Continuation-in-part of Ser. No. 812,123, Dec. 24, 1991, abandoned.

[51] Int. Cl.$^6$ ................................................ B01D 29/64
[52] U.S. Cl. .................. 210/321.63; 210/321.84; 210/334; 210/344; 210/346; 210/415; 210/450; 210/492
[58] Field of Search ................... 210/321.63, 321.68, 210/321.84, 334, 414, 415, 344, 345, 346, 413, 450, 492

[56] References Cited

U.S. PATENT DOCUMENTS

| | | |
|---|---|---|
| 347,275 | 8/1886 | Lord et al. . |
| 1,249,835 | 12/1917 | Salisbury . |
| 1,673,572 | 6/1928 | Liddell . |
| 2,207,618 | 7/1940 | Grill et al. . |
| 2,399,710 | 5/1946 | Schock . |
| 2,885,082 | 5/1959 | Stafford . |
| 2,936,075 | 5/1960 | Davis . |
| 3,064,817 | 11/1962 | Van Der Werff ............... 210/347 |
| 3,200,105 | 8/1965 | Barber et al. . |
| 3,365,065 | 1/1968 | Varjabedian . |
| 3,437,208 | 4/1969 | Kaspar et al. . |
| 3,472,765 | 10/1969 | Budd et al. . |
| 3,477,575 | 11/1969 | Nemec et al. . |
| 3,502,575 | 3/1970 | Hepp et al. . |
| 3,606,016 | 9/1971 | Sasaki . |
| 3,623,610 | 11/1971 | Olsen et al. . |
| 3,648,844 | 3/1972 | Krynski et al. . |

(List continued on next page.)

FOREIGN PATENT DOCUMENTS

| | | |
|---|---|---|
| 66111 | 4/1987 | Australia . |
| 258313 | 11/1967 | Austria . |
| 1198062 | 12/1985 | Canada . |
| 1323845 | 11/1993 | Canada . |
| 0044524 | 1/1982 | European Pat. Off. . |
| 0045033 | 2/1982 | European Pat. Off. . |
| 066198 | 12/1982 | European Pat. Off. . |
| 0220324 | 5/1987 | European Pat. Off. . |
| 0226659 | 7/1987 | European Pat. Off. . |
| 0304833 | 3/1989 | European Pat. Off. . |
| 0319564 | 6/1989 | European Pat. Off. . |
| 0324865 | 7/1989 | European Pat. Off. . |
| 0338433 | 10/1989 | European Pat. Off. . |
| 0370118 | 5/1990 | European Pat. Off. . |
| 0443469 | 8/1991 | European Pat. Off. . |
| 0529682 | 3/1993 | European Pat. Off. . |
| 2021564 | 10/1969 | France . |
| 2203664 | 10/1973 | France . |
| 2386330 | 11/1978 | France . |
| 2578440 | 5/1986 | France . |

(List continued on next page.)

OTHER PUBLICATIONS

Chemical Engineering, vol. 86, No. 16, 1979, pp. 73–76.
"Novel Solid–Liquid Separation Processes", Perry's Chemical Engineering Handbook, 6th Edition, 1984, pp. 17–51–17–54.
Murkes & Carlsson, "High–Shear Crossflow Filtration", 1988 Chapter 3, pp. 69–124.
CR 500/1000, Membrane Filter, "The New Alternative For Process–Water–Cleaning", ABB ASEA Brown Boveri.

(List continued on next page.)

*Primary Examiner*—Matthew O. Savage
*Attorney, Agent, or Firm*—Leydig, Voit & Mayer

[57] ABSTRACT

A dynamic filter system comprises a dynamic filter assembly including one or more filter elements and one or more members disposed within a housing. The filter elements and the members are interleaved and arranged to rotate with respect to one another.

81 Claims, 19 Drawing Sheets

U.S. PATENT DOCUMENTS

| | | |
|---|---|---|
| 3,669,879 | 6/1972 | Berriman . |
| 3,764,526 | 10/1973 | King . |
| 3,766,059 | 10/1973 | Sasaki . |
| 3,879,286 | 4/1975 | Berriman . |
| 3,884,805 | 5/1975 | Bagdasarian et al. . |
| 3,884,813 | 5/1975 | Donovan et al. . |
| 3,948,778 | 4/1976 | Muller . |
| 3,980,562 | 9/1976 | Nilsson . |
| 3,984,317 | 10/1976 | Donovan . |
| 3,989,629 | 11/1976 | Donovan . |
| 3,997,447 | 12/1976 | Breton et al. . |
| 4,025,425 | 5/1977 | Croopnick et al. . |
| 4,066,546 | 1/1978 | Sasaki . |
| 4,093,552 | 6/1978 | Guyer . |
| 4,132,649 | 1/1979 | Croopnick et al. . |
| 4,155,290 | 5/1979 | Da Dalt . |
| 4,156,647 | 5/1979 | Nieuwenhuis . |
| 4,216,094 | 8/1980 | Solum . |
| 4,330,405 | 5/1982 | Davis et al. . |
| 4,335,994 | 6/1982 | Gurth . |
| 4,340,480 | 7/1982 | Pall et al. . |
| 4,376,049 | 3/1983 | Valentine . |
| 4,404,106 | 9/1983 | Muller et al. . |
| 4,430,901 | 2/1984 | Rogers . |
| 4,487,689 | 12/1984 | Galaj . |
| 4,501,663 | 2/1985 | Merrill . |
| 4,514,139 | 4/1985 | Gurth . |
| 4,553,387 | 11/1985 | Mayer . |
| 4,576,715 | 3/1986 | Michaels et al. . |
| 4,631,130 | 12/1986 | Watanabe . |
| 4,655,920 | 4/1987 | Ragnegard . |
| 4,666,603 | 5/1987 | Madsen et al. . |
| 4,695,380 | 9/1987 | Hilgendorff et al. . |
| 4,696,433 | 9/1987 | Lenz et al. . |
| 4,698,156 | 10/1987 | Bumpers . |
| 4,708,797 | 11/1987 | Baur et al. . |
| 4,717,485 | 1/1988 | Brunsell et al. . |
| 4,740,312 | 4/1988 | Dahlquist et al. . |
| 4,768,920 | 9/1988 | Gurth . |
| 4,773,819 | 9/1988 | Gurth . |
| 4,781,828 | 11/1988 | Kupka . |
| 4,781,835 | 11/1988 | Bahr et al. . |
| 4,790,942 | 12/1988 | Shmidt et al. . |
| 4,816,150 | 3/1989 | Pierrard et al. . |
| 4,844,794 | 7/1989 | Ziller . |
| 4,867,878 | 9/1989 | Rashev . |
| 4,876,013 | 10/1989 | Shmidt et al. ............ 210/321.68 |
| 4,906,379 | 3/1990 | Hodgins et al. . |
| 4,911,847 | 3/1990 | Shmidt et al. . |
| 4,919,806 | 4/1990 | Yagishita . |
| 4,925,557 | 5/1990 | Ahlberg et al. . |
| 4,935,002 | 6/1990 | Gordon . |
| 4,940,385 | 7/1990 | Gurth . |
| 4,943,374 | 7/1990 | Heininger et al. . |
| 4,950,403 | 8/1990 | Hauff et al. . |
| 4,968,600 | 11/1990 | Haraguchi et al. . |
| 5,000,848 | 3/1991 | Hodgins et al. . |
| 5,019,255 | 5/1991 | Dahlquist et al. . |
| 5,034,135 | 7/1991 | Fischel . |
| 5,084,220 | 1/1992 | Moller . |
| 5,114,588 | 5/1992 | Greene . |
| 5,143,616 | 9/1992 | Pall et al. . |
| 5,143,630 | 9/1992 | Rolichigo ................ 210/780 |
| 5,192,434 | 3/1993 | Moller . |
| 5,200,076 | 4/1993 | Salyer . |
| 5,215,663 | 6/1993 | Greene . |
| 5,254,250 | 10/1993 | Rolchigo et al. . |
| 5,275,725 | 1/1994 | Ishii et al. . |
| 5,298,016 | 3/1994 | Gordon . |
| 5,415,781 | 5/1995 | Randhahn et al. . |

FOREIGN PATENT DOCUMENTS

| | | |
|---|---|---|
| 2446157 | 4/1976 | Germany . |
| 89 12282 | 3/1990 | Germany . |
| 4015187 | 11/1990 | Germany . |
| 63688 | 5/1995 | Ireland . |
| 58-45766 | 10/1983 | Japan . |
| 59-2812 | 1/1984 | Japan . |
| 62-97604 | 5/1987 | Japan . |
| 62-97605 | 5/1987 | Japan . |
| 62-97607 | 5/1987 | Japan . |
| 62-148301 | 9/1987 | Japan . |
| 62-148302 | 9/1987 | Japan . |
| 62-151904 | 9/1987 | Japan . |
| 62-151906 | 9/1987 | Japan . |
| 62-213808 | 9/1987 | Japan . |
| 62-213809 | 9/1987 | Japan . |
| 62-213810 | 9/1987 | Japan . |
| 62-213811 | 9/1987 | Japan . |
| 62-269708 | 11/1987 | Japan . |
| 62-279807 | 12/1987 | Japan . |
| 63-252518 | 10/1988 | Japan . |
| 63-252519 | 10/1988 | Japan . |
| 1139114 | 5/1989 | Japan . |
| 192210 | 6/1989 | Japan . |
| 1270916 | 10/1989 | Japan . |
| 1297104 | 11/1989 | Japan . |
| 2187101 | 7/1990 | Japan . |
| 2187102 | 7/1990 | Japan . |
| 2142606 | 12/1990 | Japan . |
| 311428 | 2/1991 | Japan . |
| 341785 | 9/1991 | Japan . |
| 341786 | 9/1991 | Japan . |
| 4281829 | 10/1992 | Japan . |
| 4122634 | 11/1992 | Japan . |
| 523194 | 2/1993 | Japan . |
| 5228348 | 9/1993 | Japan . |
| 591203 | 1/1978 | U.S.S.R. . |
| 22560 | of 1911 | United Kingdom . |
| 1057015 | 2/1967 | United Kingdom . |
| 1282629 | 7/1972 | United Kingdom . |
| 1525071 | 9/1978 | United Kingdom . |
| 2173421 | 10/1986 | United Kingdom . |
| 2201355 | 9/1988 | United Kingdom . |
| 86 06006 | 10/1986 | WIPO . |
| 88 10144 | 12/1988 | WIPO . |
| 89 05181 | 6/1989 | WIPO . |
| 93 12859 | 7/1993 | WIPO . |
| 95 00231 | 1/1995 | WIPO . |

OTHER PUBLICATIONS

Dahlquist et al., "The CR–Filter, A New Membrane Filter With Rotating Elements", pp. 1–3.

Winzeler, Heinz B. "Membrane–Filtration mit hoher Trennleistung und minimalem Energiebedarf"; Chimia 44 (1990) pp. 288–291.

Discflo Pumps, "The Proven Cost Effective Answer To Difficult Pumping Problems".

Erik Dahlquist et al., "New Developments In High Shear Crossflow Membrane Filtration", Fluid Particle, 1991, pp. 118–133.

"Continuous Pressure Filter"; Ingersoll–Rand, Industrial Process Machinery.

Nashua, N.H., "Artisan Dynamic Thickener/Washer", Ingersoll–Rand Industrial Process Machinery Bulletin No. 4081.

Nashua, N.H., "Artisan Continuous Filter For The Processing Industries"; Ingersoll–Rand; Industrial Process Mach. Bulletin 4060.

Nashua, N.H., "Continuous Pressure Filter"; Ingersoll–Rand; Industrial Process Machinery.

Cheng, K.S., Ph.D., "Thin Cake Filtration: Theory & Practice"; Batelle Press; Columbus, OH; pp. 42–50; 1990.

J. Snowman, "Sealing Technology In Lyophilizers"; Edwards High Vacuum International; pp. 81–86.

Bruce E. Hammer et al., "Quantitative Flow Measurements . . ."; Biotechnology, Vo. 8, pp. 327–330, Apr. 1990.

"Kramer—Rotorfilter"; Walter Kramer, GmbH.

R. Wisniewski, "Anticipated Effects of Seal Interface Operating Conditions On Biological Materials"; Gentech, Inc.; pp. 87–96.

Alan O. Lebeck, "Principles and Design of Mechanical Face Seals" Mechanical Seal Technology, Inc.; 1991.

D.L. Todhunter, "Improving the Life Expectancy of Mechanical Seals in Aseptic Service"; The Seal Source; pp. 97–103.

Ivo M. Fodor, "Mechanical Seals: Design Solutions for Trouble Free Sterile Applications"; Dynamic Engineering, Ltd., pp. 89–98.

S. Wronski et al., "Dynamic Filtration in Biotechnology"; Bioprocess Engineering, vol. 4, 1989, pp. 99–104.

S. Wronski et al., "Resistance Model for High–Shear Dynamic Microfiltration"; Proceedings of the Filtration Society; 1989.

"Bioprocess Engineering"; Warsaw University of Technology Institute of Chemical & Process Engineering; 30 Jun. 1989.

E. Moiga et al., "Dynamic Filtration in Obtaining of High Purity Materials . . ."; Filtration & Separation, Oct. 1988.

S. Wronski, "Filtracja Dynamiczna Roztworow Polimerow"; Inzynieria I Aparatura Chemiczna.

S. Wronski, "Problems of Dynamic Filtration"; Prace Instytutu Inzynierii Chemicznych, pp. 6–24.

M. Shirato et al., "Patterns of Flow in a Filter . . ."; International Chemical Engineering, vol. 27, No. 2, Apr. 1987.

K. Watanabe, "Experiments on the Fluid Friction of a Rotating Disc with Blades"; vol. 5, No. 17, pp. 49–57, 1962.

S. Wronski et al., "Power Consumption in Dynamic Disc Filters"; Institute of Chemical Engineering, Warsaw Tech. Univ., 1994.

N. Schweigler et al., "High Performance Disc Filter for Dewatering Mineral Slurries"; Filtration Society at Filtech, 89.

G. Parkinson, "Novel Separator Makes It's Debut"; Chemical Engineering, Jan. 1989.

"SpinTek Introduces Small Centrifugal Crossflow UF System"; Membrane & Separation Technology News; vol. 10, No. 12, Aug., 92.

"How to keep your fluid processing budget from going to waste"; AquaTechnology, Resource Management, Inc.

"DMF Dynamic Membrane Filter"; Pall Corporation, Advanced Separations Systems, 6 pages.

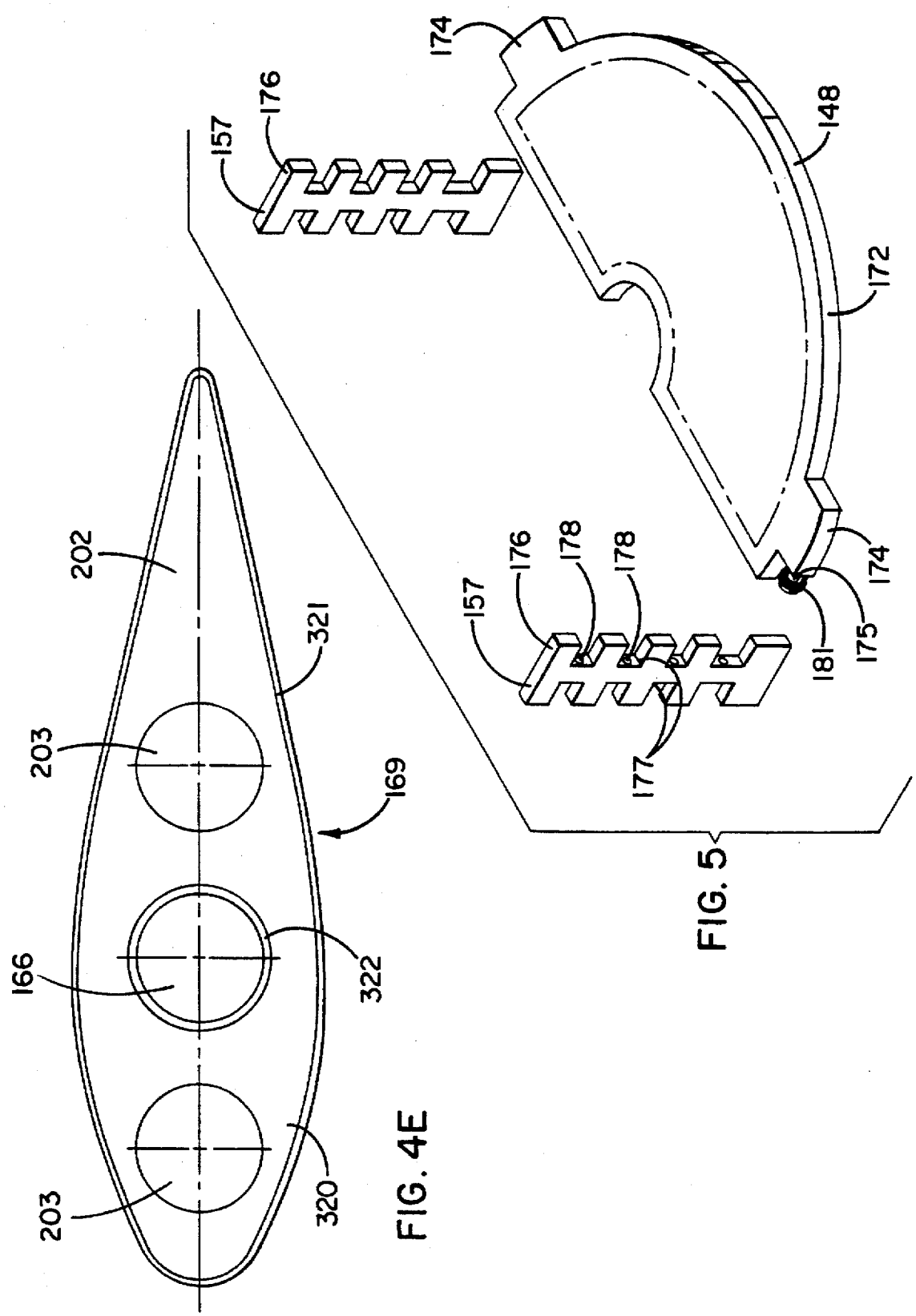

DYNAMIC FILTER SYSTEM

This application is a continuation-in-part of U.S. application Ser. No. 07/812,123 filed on Dec. 24, 1991, now abandoned.

TECHNICAL FIELD

The present invention relates to a dynamic filter assembly and, in particular, to a an improved dynamic filter assembly and filter unit.

BACKGROUND OF THE INVENTION

A disk-type dynamic filter assembly typically includes a housing which contains a filter unit comprising one or more filter elements and a rotary unit comprising one or more members. The filter elements of the filter unit and the members of the rotary unit may have any of a variety of suitable configurations. Very often, the filter unit comprises a stack of flat, disk-shaped filter elements while the rotary unit comprises a stack of flat rotary disks coupled to a shaft. The rotary disks are interleaved between the filter elements with a gap maintained between each filter element and rotary disk and the rotary disks are arranged to rotate with respect to the filter elements.

While the rotary disks are rotating, a process fluid is pumped into the housing through a process fluid inlet. The process fluid then passes through the gaps between the rotary disks and the filter element. Part of the process fluid, i.e., the permeate, passes through the filter elements and exits the housing through a permeate outlet. The remainder of the process fluid, i.e, the retentate, exits the housing through a retentate outlet.

The relative rotation of the rotary disks and the filter elements causes the process fluid in the gaps between the rotary disks and the filter elements to sweep the surface of the filter elements. Debris is thus prevented from accumulating on the surface of the filter elements and fouling or clogging of the filter elements is minimized. This extends the useful life of the filter elements.

While conventional disk-type dynamic filter assemblies have proven very effective, they nevertheless have several disadvantages. For example, although the useful life of the filter elements in a dynamic filter assembly may be extended, the filter elements will eventually become sufficiently fouled or clogged with debris to require removal. Unfortunately, removal of the filter elements can be exceedingly difficult. Conventional filter elements may comprise a portion of the housing itself and access to each of the filter elements may require complete disassembly of the entire dynamic filter assembly, including the filter unit and the rotational unit. Furthermore, mechanisms for attaching filter media to the filter elements further add to the complexity and intricacy of conventional dynamic assemblies. Because of the number of components of the attachment mechanisms and the fragility of the filter media, the integrity of these conventional dynamic filter assemblies may be initially questionable or may deteriorate very rapidly. Consequently, not only are integrity and integrity testing problematical, but removal and replacement of the filter elements are both technically difficult and time consuming.

Another disadvantage of conventional dynamic filter assemblies is that they are very difficult to clean in place, e.g., automatically clean without completely disassembling the assembly. A conventional dynamic assembly typically has a multi-component housing, filter unit, and rotational unit, each of which are rife with cracks and crevices. Further, the filter unit and the rotor unit are frequently constructed and positioned within the housing in a manner which results in stagnant regions or regions of low flow velocity within the housing. These cracks, crevices, stagnant regions, and low flow velocity regions all collect and harbor contaminants which are difficult or impossible to remove by cleaning in place.

Yet another disadvantage with conventional dynamic filter assemblies is that they heat the process fluid. The rotation of the disks within the housing causes the process fluid to heat up. Yet some process fluids are very sensitive to temperature. The heat transferred to the process fluid from the rotating disk can harm or valuable components of the fluid.

Further, to pump the process fluid through the dynamic filter assembly, conventional systems have employed a first pump for pumping the process fluid into the process fluid inlet and a second pump for withdrawing the retentate from the retentate outlet. While there are some applications in which the use of two pumps is advantageous, it nonetheless increases the cost and mechanical complexity of the dynamic filter system.

SUMMARY OF THE INVENTION

A principal object of the present invention is to provide a dynamic filter assembly in which the filter elements may be quickly and easily removed and replaced. Additional objects are (1) to provide a filter unit which can be conveniently and reliably tested; (2) to provide a dynamic filter assembly which utilizes a wide variety of materials to meet the requirements of the filtering process and which accommodates the dissimilar materials without impairing the function of the dynamic filter assembly; (3) to provide a dimensionally stable filter unit; (4) to provide a simple support structure for supporting the filter elements while simultaneously serving as duct system for supplying and/or retrieving process fluid or permeate; (5) to provide a dynamic filter assembly which can be effectively cleaned in place; and (6) to provide a dynamic filter assembly which protects the process fluid and/or the permeate from undue temperature increases.

Another principal object of the present invention is to provide pumping action in addition or even replacing an external pump for pumping the process fluid through the dynamic filter assembly. The present invention thus provides pumping action within the dynamic filter assembly itself and accomplishes this with a specific design and mode of operation.

Another principal object of the present invention is to provide enhanced turbulence and shear rate in the gaps of the dynamic filter assembly. Based on a particular feature of this invention, it is possible to provide pumping action while at the same time creating the above mentioned turbulence.

In accordance with one or more of these objects, the present invention provides a dynamic filter assembly comprising a housing and a stationary filter unit. The housing has a base, a process fluid inlet which allows process fluid to enter the housing, and a permeate outlet which allows permeate to exit the housing. The stationary filter unit is disposed within the housing and includes two or more stacked filter elements. Each filter element includes a permeate passage, a pair of opposed major surfaces, a peripheral edge bounding the major surfaces, and a filter medium positioned on at least one of the major surfaces. One of the major surfaces of one of the filter elements is generally parallel to one of the major surfaces of another of the filter elements. Each filter medium has an upstream side fluidly coupled to the process fluid inlet and a downstream side fluidly coupled to the permeate passage in the filter element. The filter unit further includes two or more posts coupled to the housing and the filter elements to secure the filter elements to the base of the housing. A first post includes two or more spacers respectively disposed between the major surfaces of the filter elements to space the filter elements apart from one another. The spacers support the filter elements at a location radially inwardly of the peripheral edges of the filter elements. The first post also includes a bore extending transversely through the spacers and the major surfaces of the filter elements. The bore fluidly communicates between the permeate passage of each filter element and the permeate outlet. The dynamic filter assembly further comprises a connector and a member. The connector extends transversely of the base and the first post to secure the filter unit against the base. The member is disposed within the housing facing the filter medium of at least one of the filter elements. The member is arranged to rotate relative to the filter medium to prevent fouling of the filter medium.

In a preferred embodiment of the invention, the stationary filter unit includes at least first and second filter modules. The first filter module includes a first post and two or more stacked filter sectors coupled to the first post. The second filter module includes a second post and two or more stacked filter sectors coupled to the second post. In a further preferred embodiment, the first and second filter modules are positioned within the housing with the filter sectors of the first filter module respectively disposed coplanar with the filter sectors of the second filter module.

BRIEF DESCRIPTION OF THE DRAWINGS

FIGS. 4B-1 and 4B-2 are a partially sectioned plan view of still another embodiment of the dynamic filter assembly with the filter removed from one of the D-shaped rigid plates;

FIG. 4E is a plan view of a gasket of the dynamic filter assembly if FIG. 4B;

FIG. 5 is a perspective view of another embodiment of the filter module;

DESCRIPTION OF EMBODIMENTS

Figure 1:
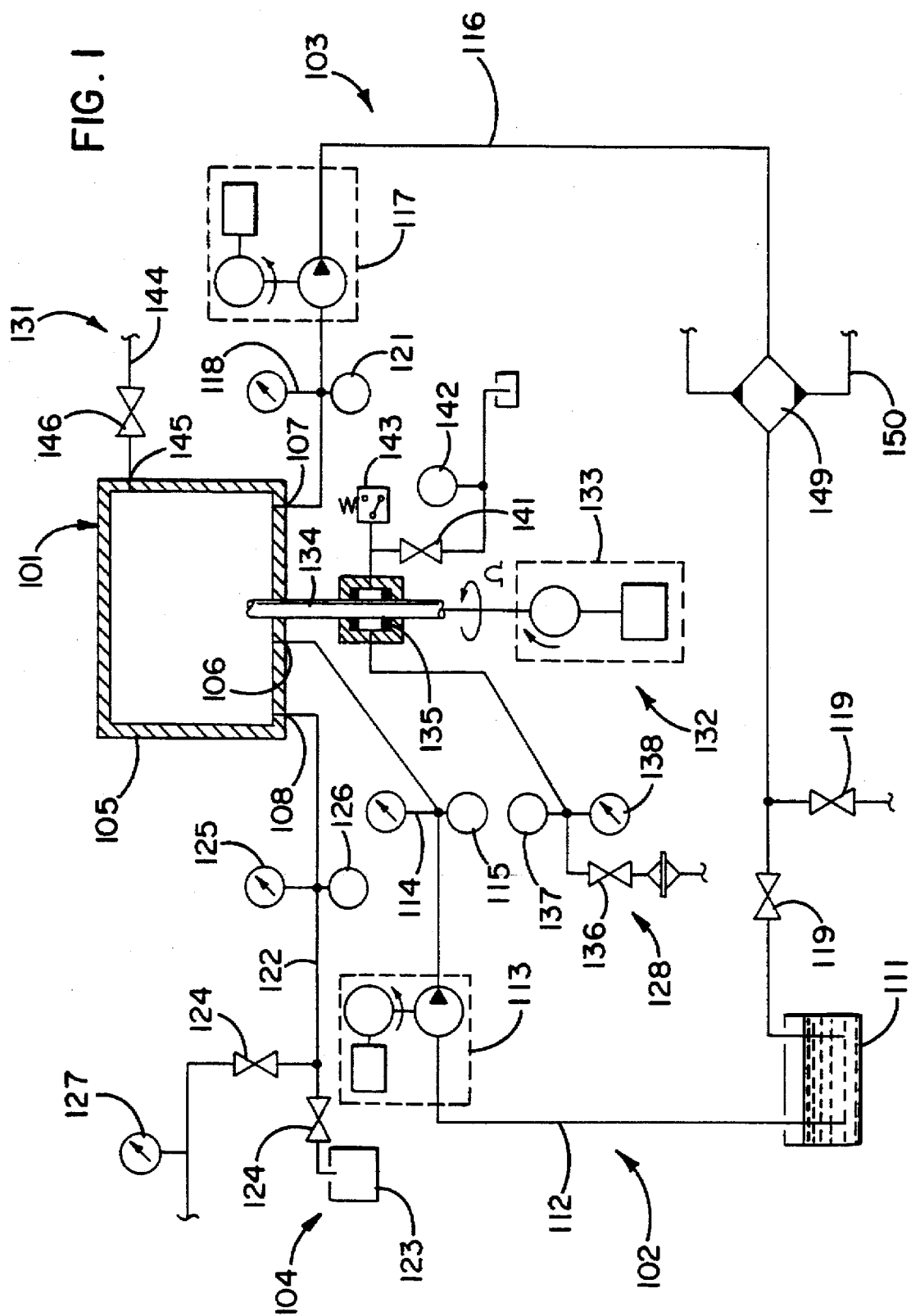
FIG. 1 is a schematic view of a dynamic filter system according to the present invention.

As shown in FIG. 1, a dynamic filter system of the present invention may include a dynamic filter assembly 101, a process fluid feed arrangement 102, a retentate recovery arrangement 103, and a permeate recovery arrangement 104. The dynamic filter assembly 101 generally comprises a housing 105 having a process fluid inlet 106, a retentate outlet 107, and a permeate outlet 108. The dynamic filter assembly 101 includes one or more filter elements and one or more members which are interleaved within the housing and arranged to rotate relative to one another.

The process fluid feed arrangement 102 is connected to the process fluid inlet 106 of the dynamic filter assembly 101 and may include a tank, vat, or other container 111 of process fluid which is coupled to the process fluid inlet 106 via a feed line 112. The process fluid feed arrangement 102 may also include a pump assembly 113 which can comprise a positive displacement pump in the feed line 112 for transporting the process fluid from the container 111 to the dynamic filter assembly 101. A pressure sensor 114 and a temperature sensor 115 coupled to the feed line 112 may also be included in the process fluid feed arrangement 102. Alternatively, the process fluid may be supplied from any suitable pressurized source and the process fluid feed arrangement may include, in addition to or instead of the pump assembly, one or more control valves and/or flow meters for controlling the flow of process fluid through the feed line to the process fluid inlet of the dynamic filter assembly.

The retentate recovery arrangement 103 is coupled to the retentate outlet 107 of the dynamic filter assembly 101. Where the dynamic filter system is a recirculating system and is designed to repeatedly pass the process fluid through the dynamic filter assembly 101, the retentate recovery arrangement 103 may include a retentate return line 116 which extends from the retentate outlet 107 to the process fluid container 111. Where the dynamic filter system is designed to pass the process fluid only once through the dynamic filter assembly, valves 119 may be coupled to the retentate return line 116 to direct the retentate to a separate retentate container or away from the dynamic filter system. The retentate recovery arrangement 103 may also include a pump assembly 117 which can include a positive displacement pump for transporting the retentate from the dynamic filter assembly 101 to the process fluid container 111. Alternatively, the retentate recovery arrangement may include, in addition to or instead of the pump assembly, one or more control valves and flow meters coupled to the retentate return line for transporting the retentate fluid from the dynamic filter assembly to the process fluid container. A pressure sensor 118 and a temperature sensor 121 coupled to the retentate return line 116 may also be included in the retentate recovery arrangement 103.

The permeate recovery arrangement 104 is coupled to the permeate outlet 108 of the dynamic filter assembly 101 and may include a permeate recovery line 122 which extends from the permeate outlet 108 to a permeate container 123. One or more valves 124 may be coupled to the permeate recovery line 122 to direct the permeate away from the dynamic filter system. Further, pressure sensors 125, 127 and a temperature sensor 126 coupled to the permeate recovery line 122 may also be included in the permeate recovery arrangement 104. Alternatively, the permeate recovery arrangement may include a pump assembly coupled to the permeate recovery line for withdrawing permeate from the dynamic filter assembly. For example, a constant displacement pump or other arrangement may be used to establish a substantially constant flux across the filter elements of the dynamic filter assembly 101, which may be useful in continuous or long-run operations. Transmembrane pressure across the filter elements can be minimized initially and then allowed to increase over time as the filter elements gradually foul.

The dynamic filter system may include various other subsystems such as a barrier fluid seal arrangement 128, a sterilization and/or cleaning arrangement 131, a heat exchange arrangement, and a transport apparatus. For example, where the relative rotation between the filter elements and the disk members is produced by a rotational unit 132 which includes a motor assembly 133 coupled to a shaft 134, the barrier fluid seal arrangement 128 may be coupled to the shaft 134 to provide a pressurized fluid at the rotary seals 135 mounted to the shaft 134. The pressurized fluid ensures proper lubrication of the seals 135 and prevents leakage of the process fluid along the shaft 134. The barrier fluid seal arrangement 128 may include a valve 136, a temperature sensor 137, and a pressure sensor 138 upstream from the rotary seals 135 as well as a valve 141, a temperature sensor 142, and a flow sensor 143 downstream from the rotary seals 135 to ensure that the barrier fluid is flowing at the proper temperature and pressure.

The sterilization and/or cleaning arrangement 131 may include a steam line 144 coupled to a steam inlet 145 of the dynamic filter assembly 101 through a valve 146. Steam may be directed through the steam line 144 into the dynamic filter assembly 101 and out through the process fluid inlet 106, the retentate outlet 107, and the permeate outlet 108 to clean and sterilize the dynamic filter assembly 101. Alternatively or in addition, a separate cleaning solution, such as a caustic solution, may be introduced into the dynamic filter assembly 101 through the process fluid inlet 106, exiting through both the retentate outlet 107 and the permeate outlet 108.

The heat exchange arrangement may be coupled to any or all of the dynamic filter assembly 101, the process fluid feed line 112, the retentate return line 116, and the permeate recovery line 122 to maintain the temperature of the process fluid, the retentate, or the permeate within a predetermined range. For example, the process fluid within the housing 105 may be heated by the relative rotation of the filter elements and the members interleaved with the filter elements. Consequently, the heat exchange arrangement may include a heat exchanger 149 mounted to the retentate recovery line 116 and supplied with a coolant through a coolant line 150 for maintaining the temperature of the retentate within the predetermined range. Alternatively, a jacket (not shown) may be mounted to the housing 105 of the dynamic filter assembly 101, preferably around the exterior of the housing 105, and may serve as the heat exchanger. The jacket may be supplied with a coolant from a coolant line (not shown) to maintain the temperature of the process fluid in the housing within a predetermined range by transferring heat from or to the process fluid through the walls of the housing 105. In yet another alternative, the housing 105 itself may contain coolant passages and serve as the heat exchanger.

The transport apparatus may comprise a skid or a cart on which some or all of the components of the dynamic filter system are mounted to facilitate transport of the system.

Figure 2:
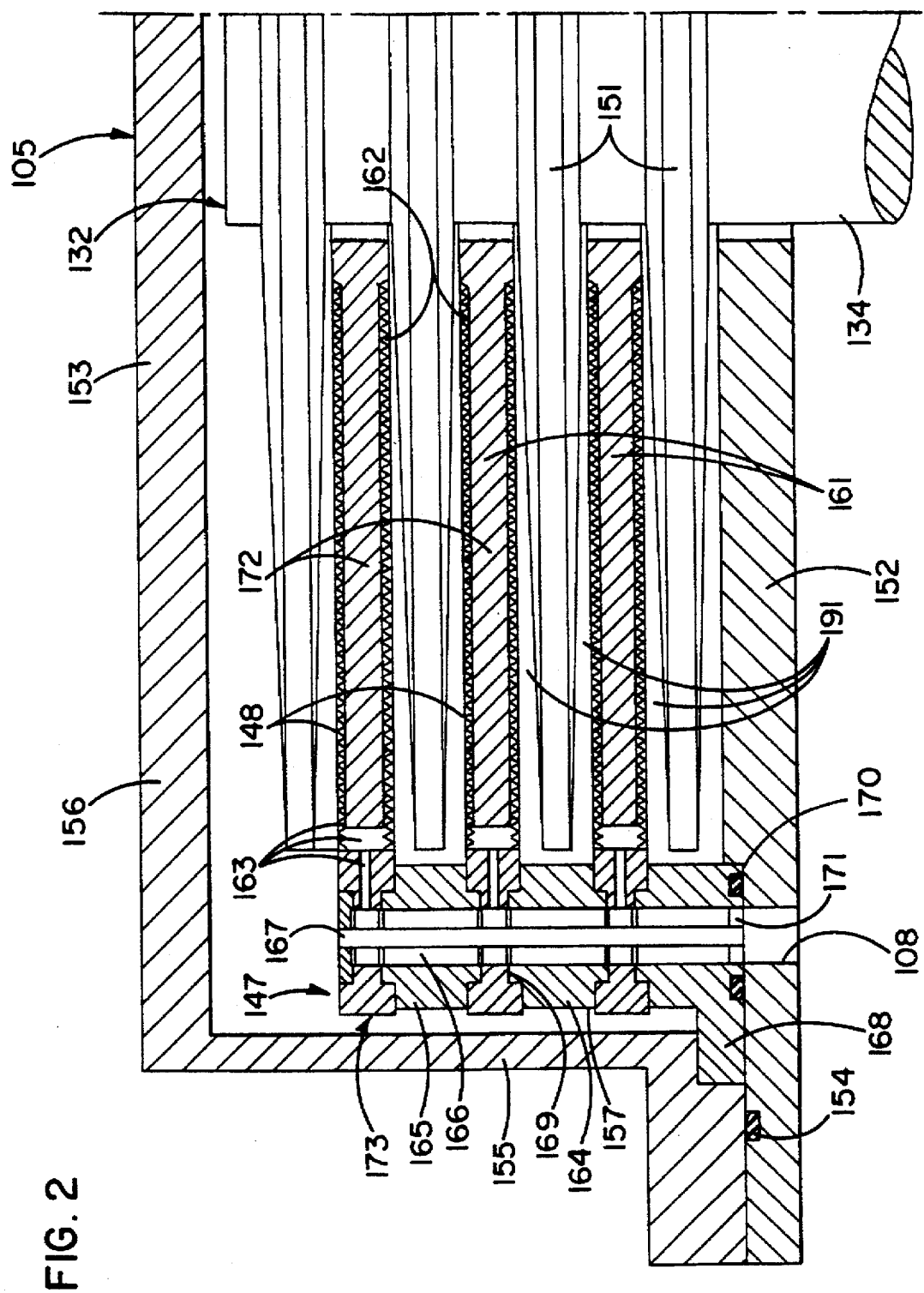
FIG. 2 is a partially sectioned elevation view of one embodiment of the dynamic filter assembly of FIG. 1.

As shown in greater detail in FIG. 2, a preferred embodiment of the dynamic filter assembly 101 preferably comprises a housing 105, a stationary filter unit 147 having one or more filter elements 148, and a rotational unit 132 having one or more members 151 which are mounted to a central shaft 134 and are interleaved with the filter elements 148. Alternatively, the dynamic filter assembly may comprise filter elements attached to a rotating housing and members attached to a rotating shaft, or filter elements attached to a stationary or a rotating shaft and members attached to a stationary or a rotating housing. However, the embodiment shown in FIG. 2 is preferred because rotating the filter elements may generate undesirable centrifugal forces in the permeate and back pressures on the filter elements. Further, attaching the members 151 to a central rotating shaft 134 simplifies the construction of the rotational unit 132 and its interface with the housing 105.

Figure 3:
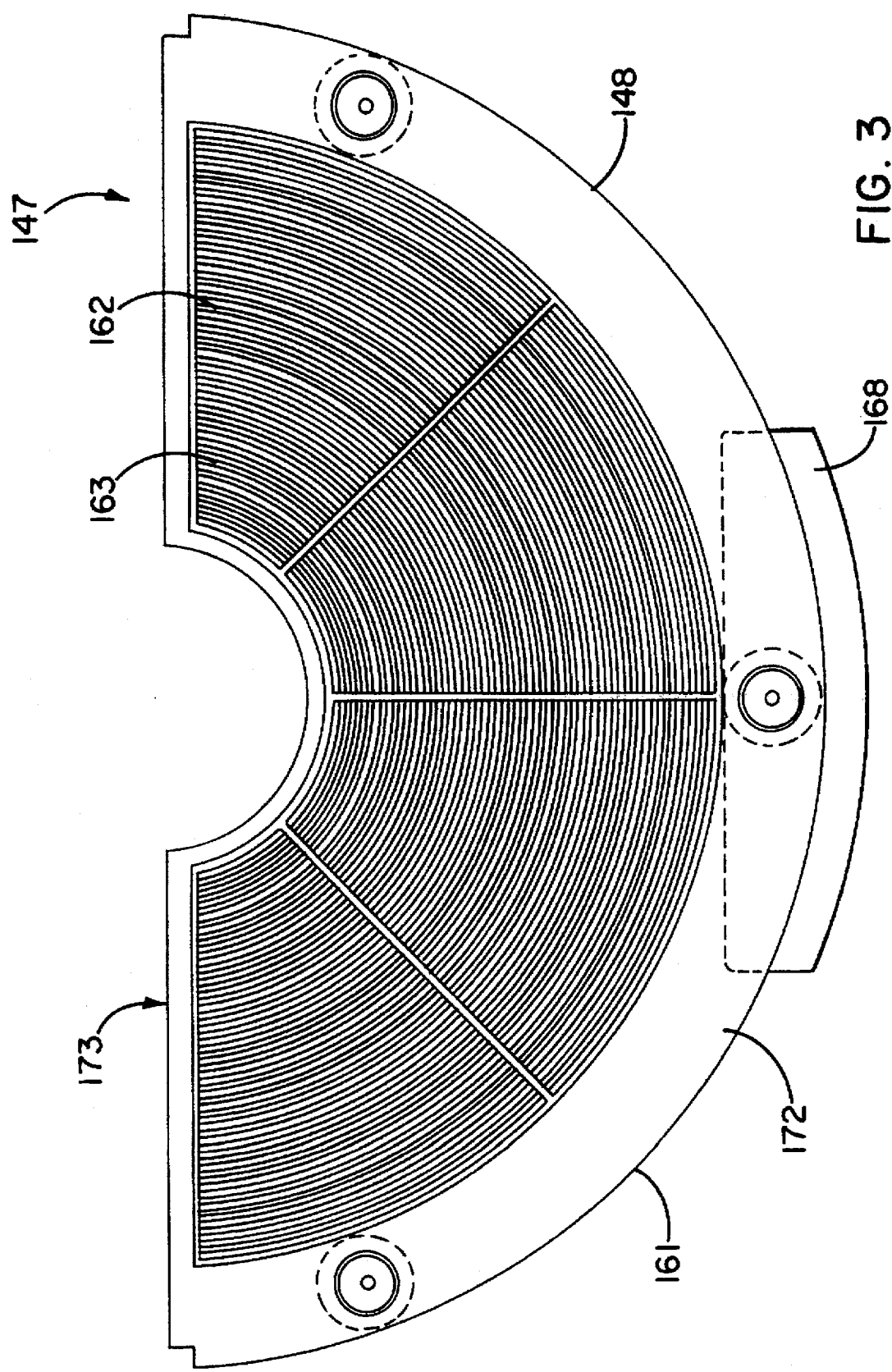
FIG. 3 is a top plan view of the filter module shown in FIG. 2.
Figure 4:
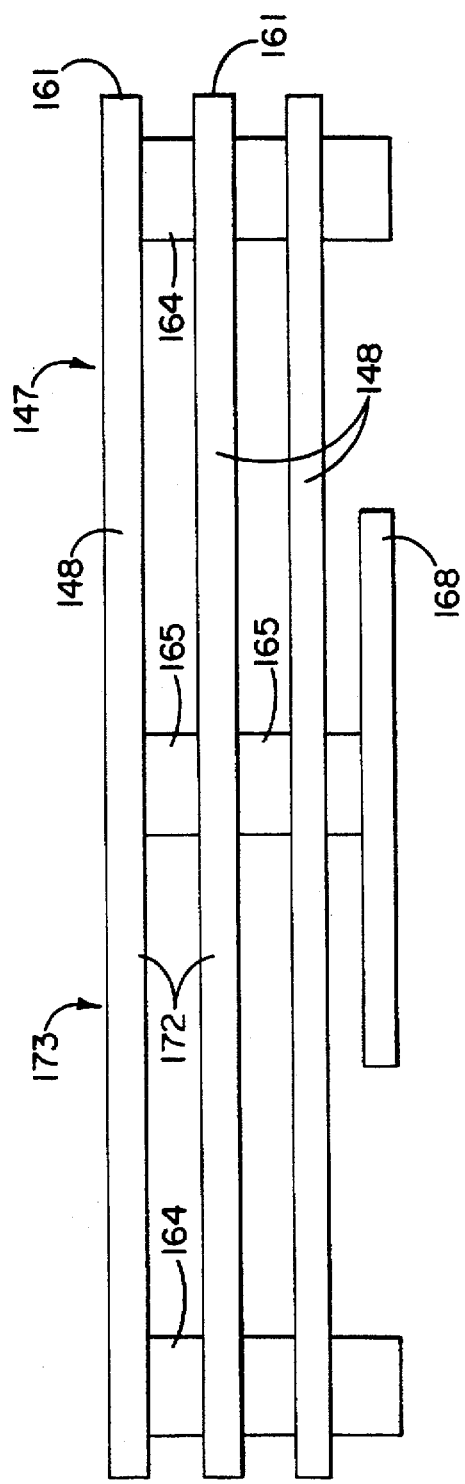
FIG. 4 is an elevation view of the filter module of FIG. 3.

The dynamic filter assembly is preferably designed to accommodate process fluids at operating pressures of up to 100 psi or more. As shown in FIGS. 2–4, the dynamic filter assembly 101 allows the process fluid to flow within the housing 105 from the process fluid inlet in parallel past each of the filter elements 148 to the retentate outlet. For parallel flow, seals can be arranged within the filter unit or between the filter unit and the housing to direct the process fluid diametrically across the filter elements or radially across the filter elements from the periphery to the center or from the center to the periphery of the filter unit. Alternatively, the dynamic filter assembly may allow the process fluid to flow within the housing from the process fluid inlet serially past each of the filter elements to the retentate outlet 107. For serial flow, seals can be arranged within the filter unit or between the filter unit and the housing to direct the process fluid serially past each filter element. Both the parallel design and the serial design are equally preferable and for any particular application one design may be more advantageous than the other design. For example, serial flow may be particularly suitable for concentrating the process fluid where the temperature of the fluid does not increase substantially between the process fluid inlet and the retentate outlet or where the temperature increase is not a problem. Parallel flow may eliminate a pressure drop axially along the filter element stack and provide nearly the same pressure profile along each individual filter element.

The housing 105 may be configured in a variety of ways. For example, it preferably has a generally cylindrical configuration which may be contoured to the filter unit 147 in order to minimize hold-up volume or not contoured to the filter unit 147 to facilitate various seal arrangements. Further, the housing 105 preferably comprises a multi-piece unit which can be conveniently disassembled and reassembled. For example, the housing 105 shown in FIG. 2 comprises a base 152 and a separable head 153 mounted to the base 152 by a clamp, by bolts, or by any other suitable arrangement. The base 152 and the head 153 are sealed to one another, preferably by an O-ring or other gasket 154 positioned between the base 152 and the head 153. The gasket 154 may be formed and/or located between the base 152 and the head 153 so that when the head 153 is mounted to the base 152, the compressed gasket 154 protrudes from the joint between the base 152 and the head 153 and slightly into the interior space defined by the housing 105. The bearings and the mechanical seals (not shown in FIG. 2) for mounting the rotational unit to the housing may be disposed in the base.

The process fluid inlet, the retentate outlet, and the permeate outlet may be located at any suitable point in the housing 105. For example, the process fluid inlet may comprise a series of ports on one side of the cylindrical portion 155 of the head 153 while the retentate outlet comprises a series of ports on the opposite side of the cylindrical portion 155 of the head 153. Alternatively, the process fluid inlet may be located in the upper portion 156 of the head 153 while the retentate outlet is located in the base 152 or vice versa. Further, both the process fluid inlet and the retentate outlet may be located in the upper portion 156 or the base 152 of the housing 105. Where fluid flow is directed along or through the shaft 134, the process fluid inlet or the retentate outlet may comprise the opening in the base 52 which accommodates the shaft 134. The permeate outlet 108 is preferably located at a convenient juncture between the housing 105 and the filter unit 147.

Figure 4A:
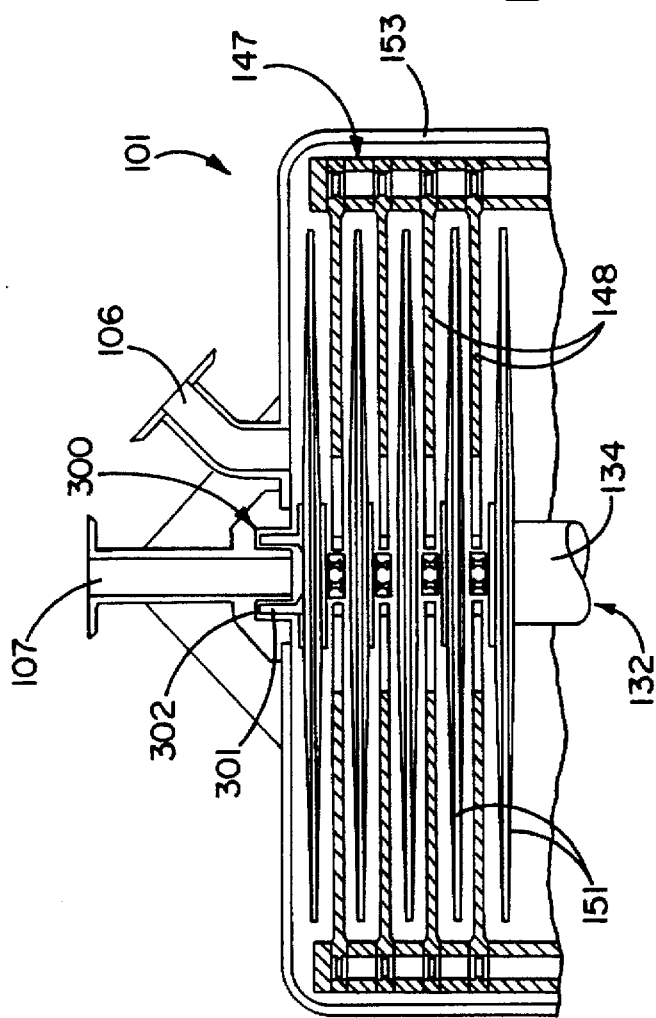
FIG. 4A is a partially sectioned elevation view of another embodiment of the dynamic filter assembly.

An example of a dynamic filter assembly 101 having a process fluid inlet 106 and a retentate outlet 107 located on top of the head 153 is shown in FIG. 4A. The rotational unit 132 includes a hollow shaft 134 having openings between each of the rotating members 151 and an opening at the top of the shaft 134 which communicates with the retentate outlet 107. A labyrinth seal 300 is positioned between the head 153 and the rotational unit 132. While the labyrinth seal 300 may be variously configured, in the illustrated embodiment it comprises a cylindrical vane 301 which extends upwardly from the uppermost rotating member 151 of the rotational unit 132. The vane 301 rotates within a cylindrical channel 302 formed in the head 153, effecting a low-bypass, zero-contact seal between the process fluid inlet 106 and the retentate outlet 107 in the uppermost region of the head 153. The process fluid is thus directed from the inlet 106, outwardly and downwardly within the head 153, radially inwardly along each of the filter elements 148, and then upwardly along the hollow shaft 134 to the outlet 107.

Although the process fluid inlet and the retentate outlet may be reversed, in the embodiment illustrated in FIG. 4A, they are preferably configured to direct process fluid through the dynamic filter assembly 101 radially inwardly along the filter elements 148. Consequently, the process fluid initially contacts the rotating members 151 at their outer periphery. The fluid may thus have a better chance of being fully spun up by the higher outer diameter shear rate at the outer periphery of the rotating members 151, thereby achieving a swirling flow pattern. In addition, to conserve angular momentum, the spin rate will increase as the process fluid moves through the gap between the rotating member 151 and the stationary filter element 148 toward the shaft 134, thereby further increasing the shear rate.

The filter unit 147 preferably includes one or more stacked filter elements 148 supported by a holder 157. The filter elements may be constructed in a variety of ways. For example, the filter elements may be flat or have a generally conical shape. Further, the filter element includes a porous filter wherein the size and distribution of the pores of the filter may be selected in accordance with the requirements of any particular application. For example, the filter element may comprise a rigid porous material such as a porous metal element or a porous ceramic element. In one embodiment, the metal element may comprise upper and lower porous metal filter layers and an internal structure including a wire mesh or an open cavity which communicates with the permeate outlet. An advantage of an embodiment having a rigid porous material is that the rigid porous filter layers can be attached only along the edge of the element and at the inner and outer diameters.

In the embodiment shown in FIGS. 2-4, each filter element 148 comprises a flat, rigid plate 161 and at least one but preferably two filters 162 respectively mounted on opposite sides of the flat plate 161. The flat plate 161 may comprise any suitably rigid material which provides sufficient structural integrity and which is compatible with the process fluid. For example, the plate 161 preferably comprises a rigid polymeric material such as nylon. In addition, the flat plate 161 may include a reinforcement such as oriented glass fibers dispersed in the polymeric material or an integral metal support. This reinforcement provides additional structural integrity. It also provides dimensional stability by resisting expansion of the plate 161 due to temperature or moisture absorption. Passages 163, including through-holes and channels such as V-shaped circumferential and radial grooves formed in the surface of the plate, allow the permeate to drain from the filter 162. The passages in the filter plate may be contoured to minimize back pressure on the filters and balance transmembrane pressure. The plate 161 may further include flats on its surfaces and edges to facilitate mounting the filter 162.

The filters of the filter unit each include an upstream side which communicates with the process fluid and a downstream side which communicates with the permeate and, therefore, divide the housing in two chambers, one chamber containing the process fluid and the other chamber containing the permeate. Each filter 162 may comprise any suitable porous filter media, including a porous metal media or a porous fibrous media, mounted to at least one surface of the plate 161, and the size and distribution of the pores of the filter media may be selected to meet the requirements of any particular application. In the embodiment shown in FIG. 2, each filter 162 comprises a porous polymeric membrane mounted to the surface of the plate 161 in any suitable manner, including heat-sealing, welding, or by means of a solvent or an adhesive.

In a preferred embodiment, the membrane is formed to the surface of the element as taught in commonly assigned U.S. application Ser. No. 07/700,268 and U.S. application Ser. No. 08/038,257, both of which are incorporated herein by reference. According to U.S. application Ser. No. 07/700, 268, a resin may be dissolved in a solvent to form a casting solution which is used to impregnate a substrate. The substrate may be a macroporous material, typically a woven or non-woven fibrous sheet, which when impregnated with or saturated by the casting solution serves as a carrier for the casting solution. The substrate is preferably composed of a material that is resistant to attack or dissolution by the solvent. The saturated substrate is positioned in contact with the surface of a support structure, such as a filter plate 161, on which the membrane is to be formed. The surface of the support on which the saturated substrate is positioned is at least slightly soluble in or softened by the solvent used to dissolve the resin.

Once the saturated substrate contacts the surface of the support, the support in the solution begins dissolving or softening the surface of the support. Because the substrate is completely and evenly saturated, the entire area of the surface to which the membrane will be formed is substantially evenly dissolved or softened by the solvent. The membrane is then formed to the surface of the support by precipitating the resin within the substrate and on to the surface of the support. For example, the resin may be precipitated from the casting solution by decreasing the concentration of the solvent in the casting solution. Alternatively, a precipitating solution may be applied to the assembly of the support and the saturated substrate. Because the resin precipitates within the reforming surface of the support, the membrane is tightly and integrally formed to the support. U.S. Pat. No. 4,340,480 discloses various casting solutions, substrates, and precipitating methods.

The porous polymeric membrane may comprise any polymeric material which is compatible with the process fluid. For example, the membrane may comprise a nylon, polyvinylidene difluoride, polyethersulphone, or PTFE. Further, the membrane may comprise a single layer or several layers and may include a woven or non-woven support such as a non-woven polypropylene. The size of the pores in the porous polymeric membrane may be selected to meet the requirements of any particular application.

The holder may serve many functions. For example, it may serve to support the filter elements in a stacked configuration, anchor the filter unit to the housing, maintain the filter elements properly spaced from another, and/or provide drainage of the permeate from the filter elements to the permeate outlet. Alternatively, these functions may be served by separate structures.

Figure 2A:
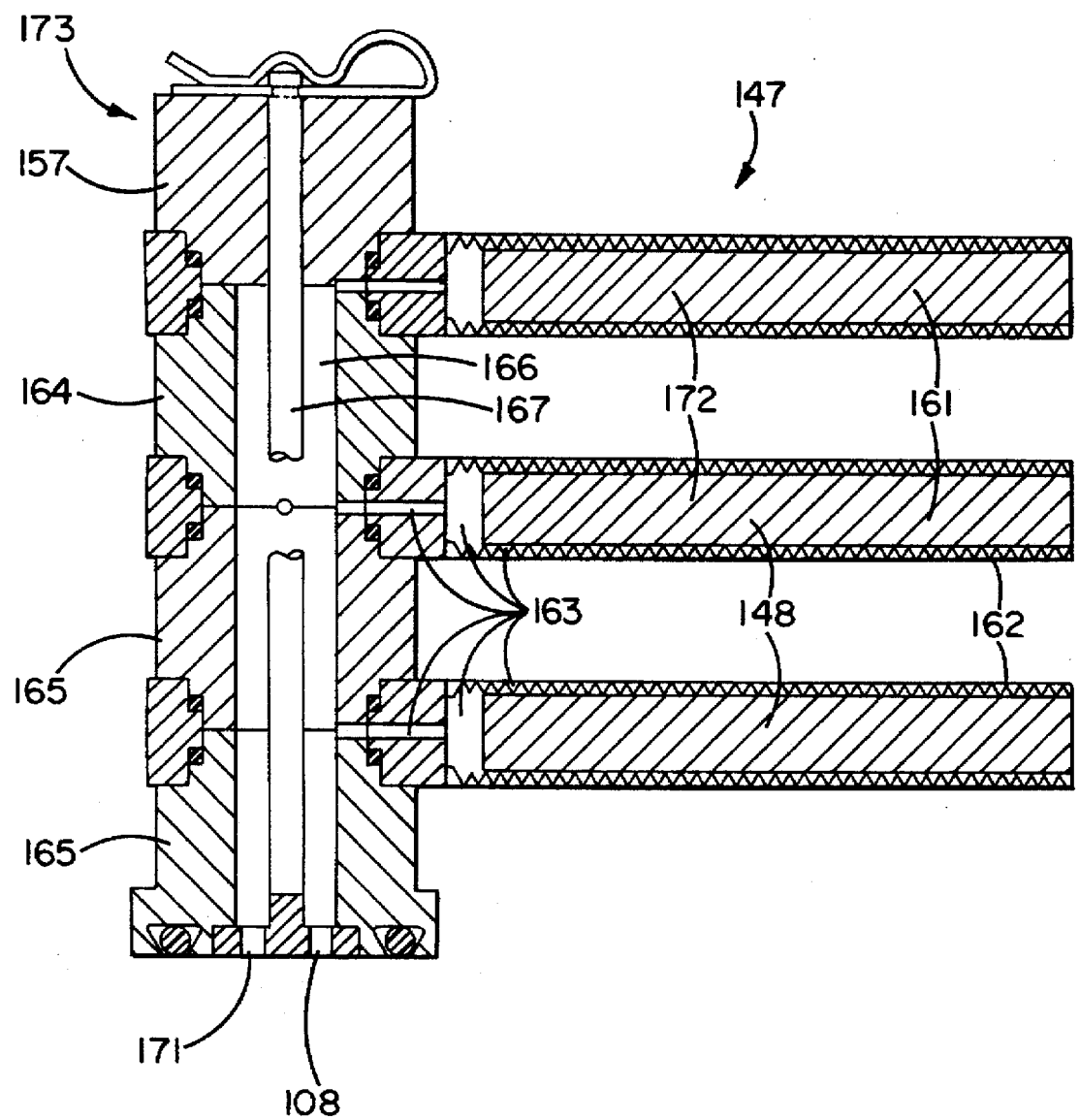
FIG. 2A is a partially sectioned elevation view of another embodiment of a filter unit.

The holder may be variously configured. For example, in the embodiment shown in FIGS. 2–4, the holder 157 comprises several posts 164 arranged at the periphery of the filter elements 148. Each post 164 includes several cylindrical sections 165, each cylindrical section 165 being stacked between peripheral portions of the plates 161 of adjacent filter elements 148. Although the filter plates 161 and the cylindrical sections 165 are shown as separate components in FIG. 2, each filter plate 161 and adjacent cylindrical section 165 could be formed as a single unitary piece. The filter elements 148 and each post 164 may be attached in any suitable manner. For example, as shown in FIG. 2, each post includes a central bore 166 through which a tie rod 167 extends. During fabrication, the tie rod 167 may be attached to the upper filter element 148 and the lower cylindrical section 165 after the stack of filter elements 148 and cylindrical sections 165 has been compressed by a predetermined load to an appropriate height. The tie rod 167 may be permanently attached, e.g., by welding, as shown in FIG. 2 or it may be removably attached, e.g., by a pin, as shown in FIG. 2A.

Where the filter plates are formed from a polymeric material, it may be particularly advantageous to form the holder from a high-strength material which has a substantially lower coefficient of expansion than the polymeric filter plate. Suitable high-strength, low-expansion materials may include a metal, such as stainless steel, or a polymeric material, such as a polyphenylene sulfide available from Phillips Petroleum under the trade designation Ryton. The holder then functions as a spacer. For example, if the cylindrical sections 165 shown in FIG. 2 are formed from a material such as stainless steel, the position of each filter element 148 in the stack of filter elements will change very little with respect to the adjacent members 151 of the rotational unit 132 regardless of the expansion of the polymeric filter plates 161 due, for example, to temperature and moisture absorption. Alternatively, a spacer clip separate from the holder may be formed from a material having a lower coefficient of expansion than the polymeric filter plate and may be separately attached to the filter elements to maintain their position.

The filter unit is preferably attached to the housing in any suitable manner which allows the filter unit to be quickly and easily removed from and installed in the housing. For example, it may be bolted to the housing or the head may include a projection which bears against and secures the filter unit on the base. In the embodiment shown in FIG. 2, one of the posts 164 includes a foot 168 which is clamped between the base 152 and the head 153 of the housing 105. The remaining posts 164 are free to slide along the base 152 of the housing 101. Having the holder 157 attached to the housing 105 at only one point allows the filter unit to expand and contract within the housing without undue stress on the filter unit. The permeate outlet 108 is preferably located in the base 152 at the bore 166 in the post 164 having the foot 168 and the bore 166 serves as a passage or duct for draining the permeate from the filter elements 148. The permeate passage in the post may be contoured to minimize back pressure on the filters of the filter elements. A spider 171 mounted within the bore 166 at the bottom of the post 164 allows the permeate to flow through the passages 163 in the filter elements 148 through the passage 166 in the post 164 past the spider 171 to the permeate outlet 108. As shown in FIG. 2, flat gaskets 169 between the filter plates 161 and the cylindrical sections 165 of the posts 164 and a gasket 170 between the post 164 and the base 152 of the housing 105 isolate the permeate from the process fluid. As shown in FIG. 2A, O-rings may be positioned between the filter plates 161 and the cylindrical sections 165 of the posts 164 to isolate the permeate from the process fluid. For the posts 164 which are not attached to the housing 105, the passages 163 in the filter elements 148 do not extend through the periphery of the filter plate to the bore of those posts.

In another embodiment shown in FIGS. 4B–4E, the holder 157 again comprises several posts 164', 164" arranged at the periphery of the filter elements 148. The posts 164', 164" and the filter elements 148 are spaced from the head 153 of the housing 105 a distance sufficient to allow cleaning in place between them. Further, each of the posts 164', 164" preferably has a cross sectional shape similar to that of a hydrofoil and are oriented to reduce drag on the process fluid swirling within the housing 105. Minimizing drag decreases the energy consumption of the dynamic filter assembly 101, enhances filtration performance by reducing disruption of the flow between the filter elements 148 and the rotating members 151, and decreases contaminant deposition within the housing 105 by minimizing the occurrence of eddies in the process fluid flow.

Figures 1, 4B:
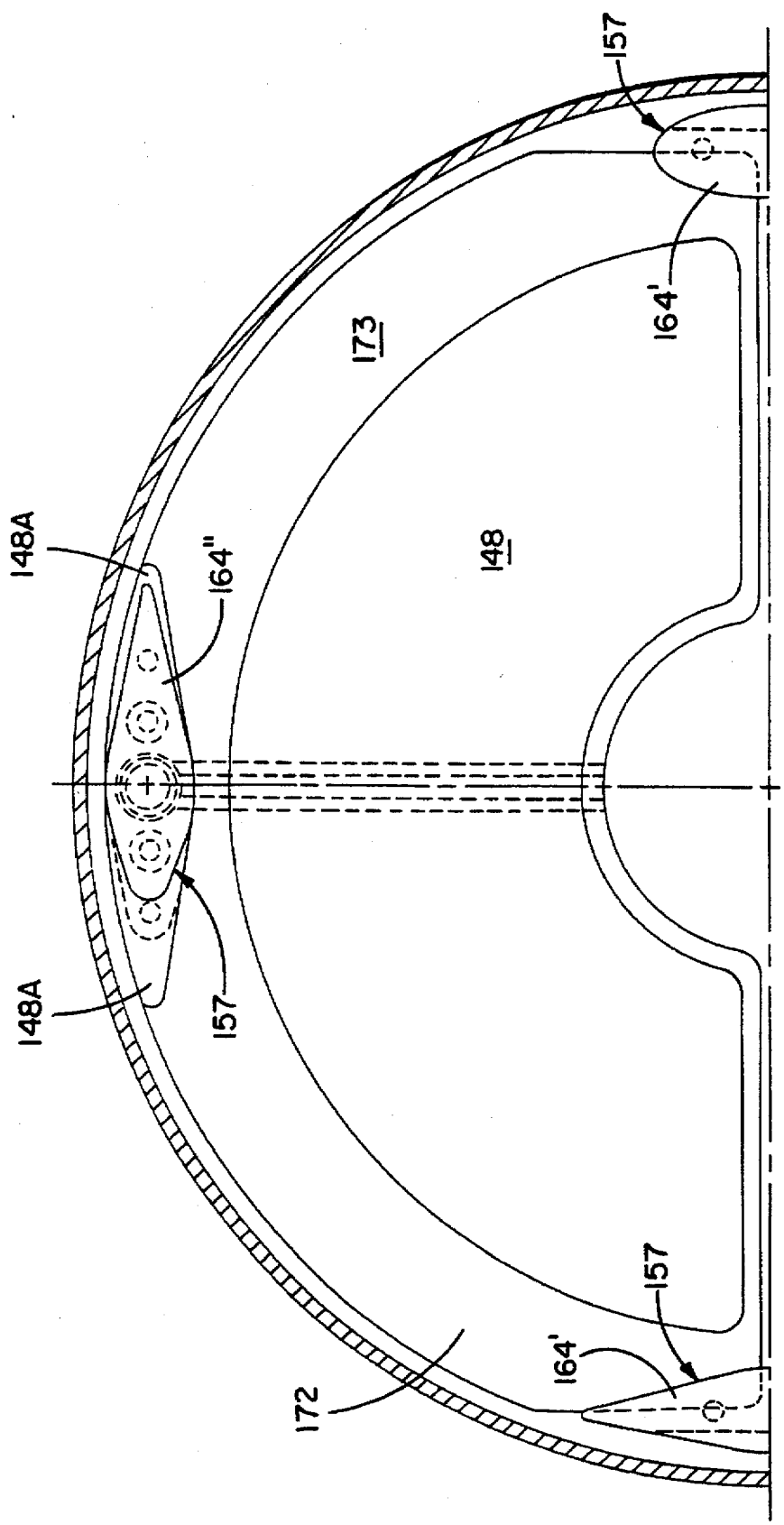
Figures 2, 4B:
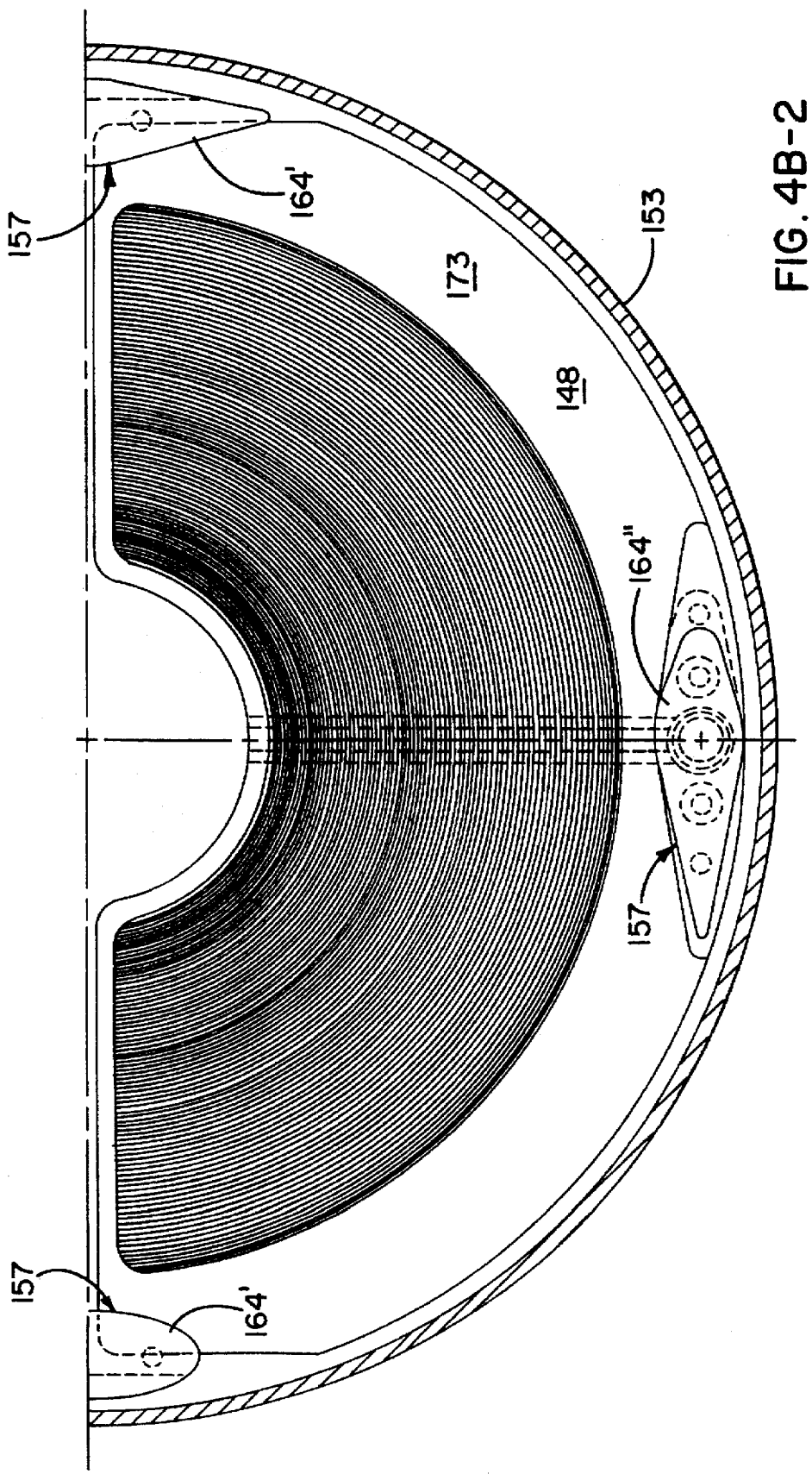

As shown in FIG. 4B-1, the posts 164', 164" are elongated and have first and second ends with a central region disposed therebetween. In the embodiment illustrated in FIG. 4B-1, the posts 164', 164" have a cross-sectional shape such that the central region is larger than the portion of the posts 164', 164" near the first and second ends. Further, as shown in FIG. 4B1, the first and second ends taper from the central region and are rounded. In the embodiment of FIG. 4B1, the first end is more rounded than the second end.

Figure 4C:
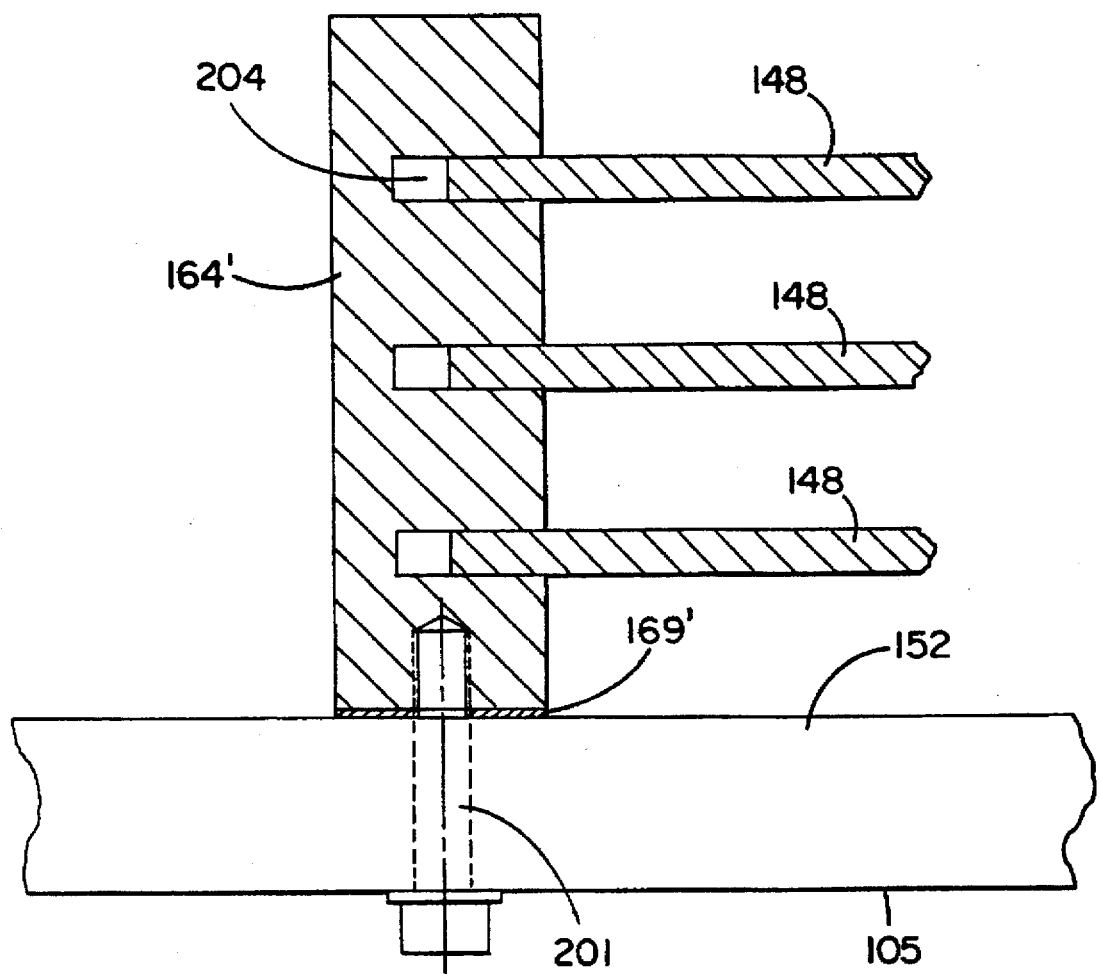
FIG. 4C is a partially sectioned elevation view of a post of the dynamic filter assembly of FIG. 4B.
Figure 4D:
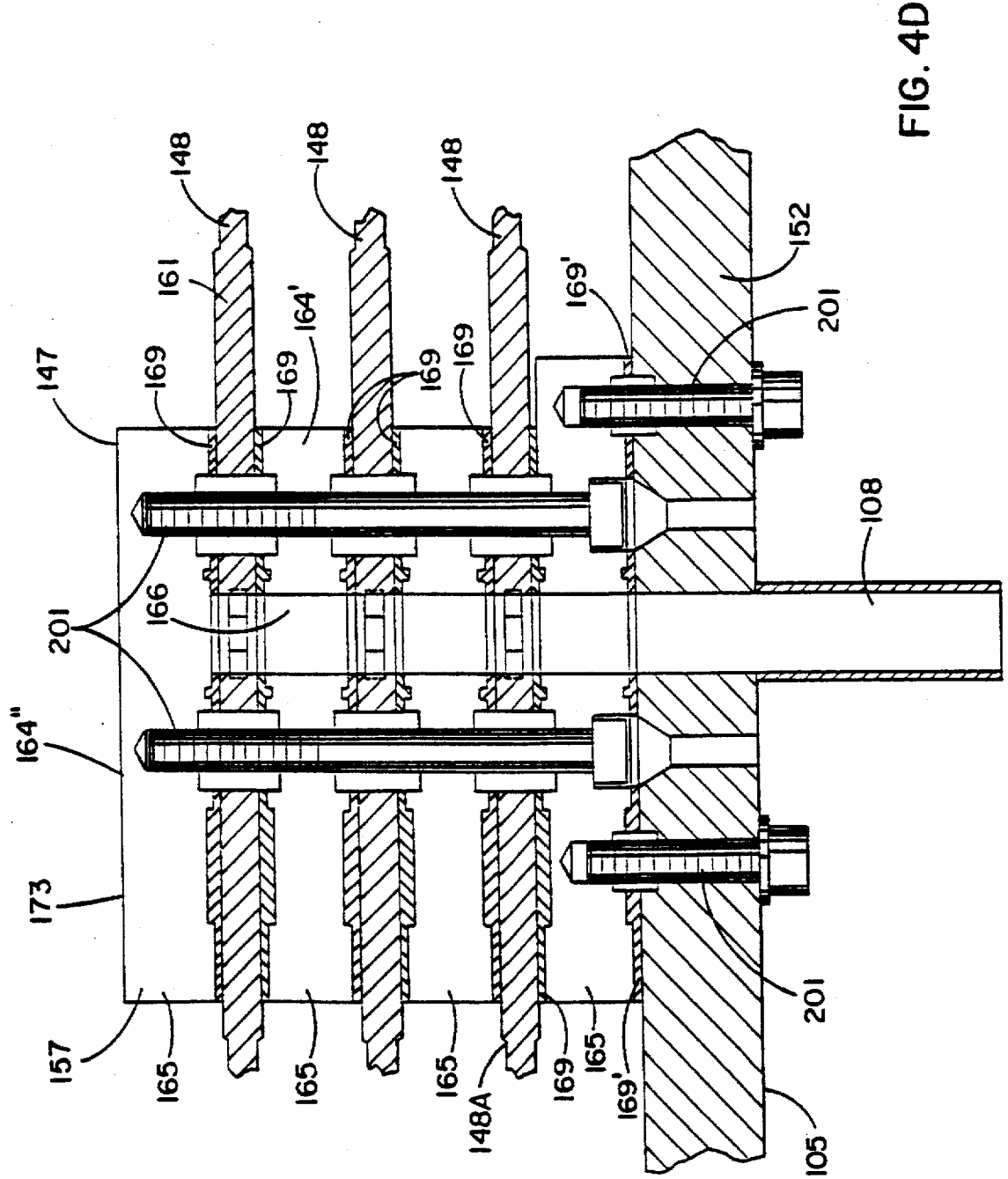
FIG. 4D is a partially sectioned elevation view of another post of the dynamic filter assembly of FIG. 4B.

Two of the posts 164' may be formed as a single unitary piece. These posts 164' may be coupled to the filter elements 148 in any suitable manner which restrains the filter elements 148 axially but allows the filter elements 148 to move at least slightly in a radial plane, thereby allowing for expansion and contraction of the filter elements 148. This may be accomplished by, for example, configuring the post 164' to include slots 204 as shown in FIG. 4C.

Each of the other posts 164" includes several sections or spacers 165. Each section 165 is stacked between peripheral portions of the plates 161 of adjacent filter elements 148 and the plates 161 separate subsequent sections 165 of the post 164". Between each section 165 and the peripheral portion of the plate 161 is a gasket 169 which is positioned on a slightly raised flat 148A formed on the plate 161. The gasket 169, which has a hydrofoil shape similar to each section 165, preferably includes a web 320 having an enlarged edge 321. Holes in the web 320 of each gasket 169 align with corresponding holes in the peripheral portions of the plates 161 and the sections 165. As shown in FIG. 4B-1, the holes may be located within an outer peripheral edge 148B of the filter elements 148. Bolts 201 may be inserted into these holes and used to tighten the arrangement of plates 161, sections 165, and gaskets 169 to an appropriate degree of compression. Preferably, the gaskets are formed and compressed sufficiently to allow the enlarged edge 321 of each gasket to protrude slightly outwardly from between the section 165 and the plate 161 into the process chamber inside the housing 105. At least one of the sets of aligned holes in the plates 161, the sections 165, and the gaskets 169 forms an axial bore 166. The axial bore 166 communicates between the permeate passages in the filter elements 148 and the permeate outlet 108 in the housing 105 and therefore serves as a passage or duct for channeling the permeate from the filter elements 148 to the exterior of the housing 105. Each of the gaskets 169 also includes an enlarged edge 322 around the axial bore 166. Consequently, when assembly of plates 161, sections 165, and gaskets 169 are compressed, the enlarged portions of the gaskets 169 around the axial bore 166 protrude slightly outwardly from between the sections 165 and the plates 161 into the axial bore 166.

Additional bolts 201 extend through the base 152 of the housing 105 into each of the posts 164', 164", securing the posts 164', 164" in place within the housing 105 and aligned with the permeate outlet 108. Again, gaskets 169' similar to the previously described gaskets 169 are positioned between the posts 164', 164" and the base 152 of the housing 105 and are compressed sufficiently to protrude slightly outwardly from the joint between the post 164', 164" and the base 152 into the process chamber inside the housing 105. For the posts 164" having the axial bore 166, the intraspaces 202 between the enlarged edges 321,322 of the gaskets 169, 169' may vent to the atmosphere via the bolt holes 203, thereby further protecting against communication between the process fluid in the process chamber of the housing 105 and the permeate in the axial bore 166.

The filter unit preferably has a modular construction which facilitates assembly and installation as well as disassembly and removal of the filter unit from the dynamic filter assembly. A modular construction also facilitates the construction of filter units having any desired predetermined number of filter elements, e.g., from 1 to 30 or more.

According to one aspect of the modular construction, the filter unit may comprise one but more preferably two or more filter modules. Where the filter unit comprises a single filter module, each of the filter elements 148 is preferably circular and may extend through approximately 360°. For example, each filter element may comprise a single circular element having a keyhole opening which would facilitate mounting the filter unit around the shaft of the rotational unit. However, where the filter unit comprises two or more modules, each 360° filter element may comprise two or more filter sections, for example, two or more filter sectors 172 spanning from about 15° or less to about 180° or more. In the embodiments shown in FIGS. 2 and 4B, each filter sector 172 spans about 180° and the filter unit 147 comprises two separate filter modules 173, each module 173 comprising a stack of 180° filter sectors mounted to their respective holder 157.

Similarly, in the embodiment shown in FIG. 4B-1, each filter sector 172 spans about 180° and is defined by an outer peripheral edge 148B spanning the outer circumference of the filter sector 172, an inner peripheral edge 148C spanning an inner circumference of the filter sector 172 and first and second radially extending edges 148D extending between the inner and outer peripheral edge 148C, 148B. The first and second major surfaces of the filter sector 172 are disposed on opposite sides of the filter sector and are surrounded by the inner and outer peripheral edges 148C, 148B, and the radially extending edges 148D. As further shown in FIG. 4B-1, the outer peripheral edge 148B may include first and second cut-away portions 148E configured to accommodate posts 164'. Alternatively, the filter unit 147 may comprise 3, 4, or more filter modules each including a holder and a stack of filter sectors spanning 120°, 90°, or less, respectively The filter unit 147 may also comprise two or more filter modules having different spans. For example, the filter unit 147 may comprise three filter modules spanning 90°, 90°, and 180°, respectively. The edges of coplanar filter sectors of any of the adjacent modules may face, abut, or mate with one another to form the circular filter element. For example, in the embodiment shown in FIG. 4B, the edges of coplanar filter modules face and are spaced from each other.

According to another aspect of the modular construction, the filter unit may comprise filter elements 148 or sections which are individually mountable to a holder. For example, as shown in FIG. 2A, a filter sector 172 and an adjacent cylindrical section 165 may be removed from or added to the holder 157 simply by removing and reinstalling the tie rod 167. Any type of filter section, e.g., one including a porous metal medium, a porous ceramic medium, a fibrous medium, or a porous membrane, may be removably mounted to the holder.

As shown in FIG. 5, a second embodiment of the filter unit comprises a holder 157 and a filter sector 172 similar to those shown in FIGS. 2-4. However, the filter sector 172 includes a pair of opposite lugs 174. At least one of the lugs 174 includes a nipple 175 which extends outwardly from the lug 174. The permeate passages within the filter sector 172 extend through the lug 174 and the nipple 175 to an opening at the end of the nipple 175. The holder 157 comprises at least two posts 176. Each post 176 may be formed as a unitary piece and may be formed from a material having a substantially lower coefficient of expansion than, for example, a polymeric filter sector 172. Each post 176 has several brackets 177 and corresponding brackets 177 on the two posts 176 receive the lugs 174 of the filter sector 172, securely holding the filter sector 172 in place. At least one of the posts 176 has a central passage or duct which communicates with each bracket 177 via a fitting 178. When the lug 174 having the nipple 175 is inserted into a bracket 177, the nipple 175 engages the fitting 178. An O-ring 181 fitted around the nipple 175 is compressed within the fitting 178 and prevents leakage of the process fluid into the permeate passages of the filter sector 172 and the post 176. The post 176 having the central passage which communicates with the permeate passages in the filter sector may be anchored to the housing at the permeate outlet, allowing the permeate to flow from the filter sector through the post to the permeate outlet.

Figure 6A:
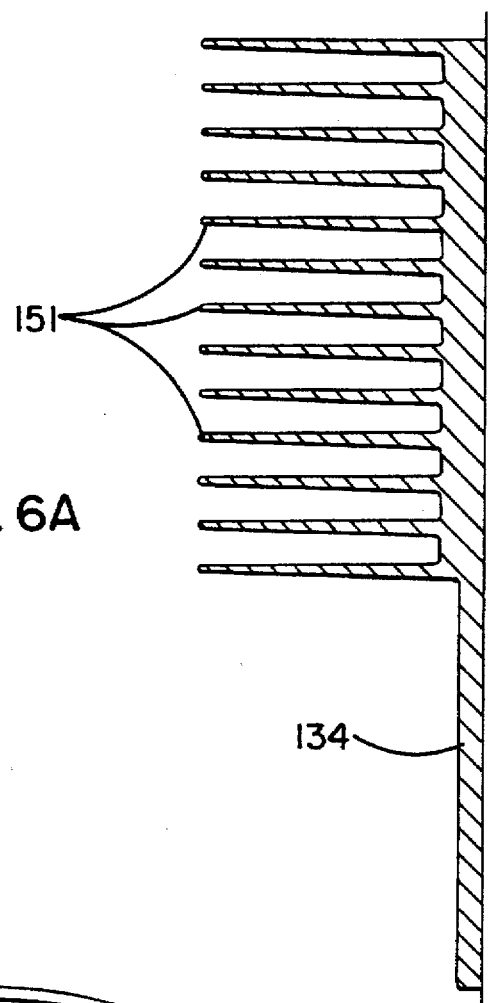
FIG. 6A is a sectioned elevation view of a rotor.
Figure 6:
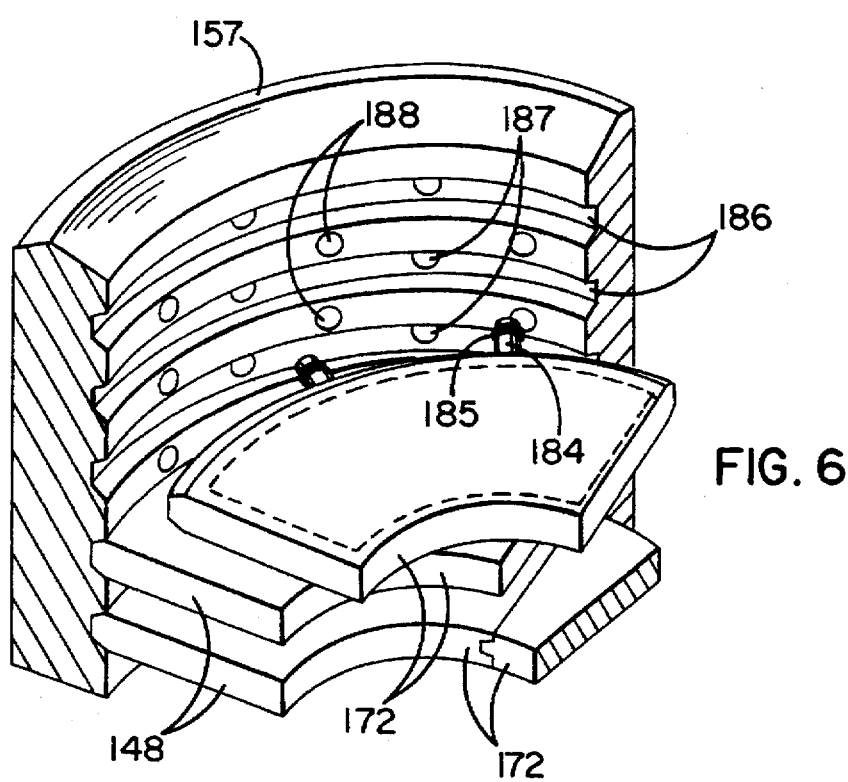
FIG. 6 is a perspective view of another embodiment of a filter module.

As shown in FIG. 6, a third embodiment of the filter unit also comprises a holder 157 and one or more filter sectors 172. Each filter sector 172 is similar to that shown in FIGS. 2–4. However, the filter sector 172 shown in FIG. 6 spans approximately 90° and has an outer periphery which is formed to securely engage the holder 157. The abutting edges of co-planer filter sectors 172 may be formed to mate with and securely engage one another. In addition, at least one nipple 184 having an encircling O-ring 185 extends outwardly from the periphery of the filter sector 172. The holder 157 comprises a quarter sector of a cylindrical wall and has grooves 186 which mate with the formed outer periphery of the filter sectors 172 to securely position the filter sectors 172 in place. Each groove has at least one fitting 187 which mates with the nipple 184 and the O-ring 185 in a manner similar to that discussed with respect to FIG. 5. Each of the fittings 187 may be connected to a passage or duct in the holder 157 which in turn communicates with the permeate outlet, allowing the permeate to flow from the filter sector 172 through the holder 157 to the permeate outlet. The holder 157 may further include one or more openings 188 between adjacent filter sectors 172. The openings 188 may be coupled to the process fluid inlet to provide process fluid between each of the adjacent filter sectors 172 or they may be coupled to the retentate outlet to remove retentate from between the filter sectors 172.

In each of FIGS. 2–6, the stack of filter elements and filter sections is oriented vertically. Alternatively, the stack may be oriented horizontally or at any angle between the horizontal and the vertical directions.

The modular construction of the filter unit provides many advantages over conventional dynamic filter assemblies. For example, installation as well as removal and replacement of the filter modules may be performed quickly and easily using commonly available tools. Once the head is removed from the base, the filter modules may be easily disentangled from the members of the rotational unit simply by sliding the filter module radially away from the rotational unit. A new filter module may just as easily be slid radially into place between the members of the rotational unit. This ease of handling is especially important for large stacks. Further, neither removal nor replacement requires disassembly of the rotational unit.

Not only can an entire filter module be replaced, but a single filter section in the filter module may also be replaced. Where the filter sections, for example the filter sectors, are removably attached to the holder, once the filter module has been removed from the housing, any defective filter sectors may be removed from the holder and replaced with new filter sectors. This significantly decreases maintenance costs because it enables replacement of only those filter sectors which are defective and increases the utility of the device as a maintainably high-integrity system.

Modular construction also provides a far more reliable filter unit because it can be much more extensively integrity tested, both during production and in the field. During production, every component of the filter unit, e.g., every filter sector, every holder, every filter module, can be tested for integrity prior to final assembly and testing. In the field, modular construction enables a single defective component of the filter unit to be easily detected. Each filter module may be individually tested for integrity to find a defective filter module and then each holder and filter sector in the defective filter module may be tested for integrity.

In addition, the modularly constructed filter unit according to the present invention is rugged enough to be cleaned in place over many cycles and yet may be composed of lightweight materials such as plastics. The modular filter units also facilitate disposal. The plastic components of the filter unit may be easily disassembled, providing a low-volume, easily-incinerable waste product.

Cleaning in place is greatly facilitated by many embodiments of the present invention. These embodiments include structural features which no not harbor contaminants and/or which give up contaminants freely during automatic cleaning in place. For example, surface finishes, in particular, of the metal components such as the base, the head, the posts, the rotating members, and the shaft, may be mechanically prepared and polished, even electropolished, to decrease surface roughness to micron and sub-micron levels, giving contaminants a more tenuous attachment. Structures, such as the head 153 of the housing 105 and the filter elements 148 or the posts 164, may be spaced from one another and the number of joints, such as the joint between the base 152 and the head 153 may be minimized to limit the number of cracks, crannies and crevices which can harbor contaminants. These cracks, crannies and crevices may be further minimized by providing glands and gaskets, such as the gaskets between the filter elements 148 and the sections 165 of the posts 164" and the gasket between the base 152 and the head 153, which are designed to be compressed to fill the joint opening, bulge into the process stream or chamber, and occlude the joint opening. For example, each generally D-shaped filter module 173 shown in FIG. 4B is free of any crevices which can harbor contaminants because the gaskets 169 protrude from each of the joints between the filter plates 161 and the post sections 165. Further, minimizing joints also minimizes the number of gaskets and obviates the need of frequent gasket replacement, which require skilled technicians to assure dynamic integrity.

In addition, features related to fluid flow within the process chamber can be designed to resist the formation of eddies and contaminant deposition. For example, structures, such as the hydrofoil posts 164', 164" are provided with low-drag, streamline shapes. Further, flow paths within the process chamber may be designed to allow high-velocity flow to reach all surfaces to transport contaminants away from the surfaces. Low-velocity zones, such as those which occur within an eddy, encourage contaminant deposition but may be minimized by coving and radiusing edges and corners, for example, of the interior of housing 105 and the filter elements 148. In addition, flat surfaces may be sloped to drain where possible to encourage run-off and minimize puddling, and large clean-out ports may be provided to allow adequate exit velocities to maintain contaminant transport.

The rotational unit, including the members 151 and the rotating shaft 134, may also be configured in a variety of ways. For example, the members 151 and the shaft 134 may be formed as a unitary rotor. Unitary construction of the rotor provides a precision, balanced rotor capable of stable operation far in excess of multiple piece assemblies. Further, a unitary rotor may be formed without crevices or joints and with rounded features, as shown in FIG. 6A, which further facilities cleaning in place.

As shown in FIG. 1, the rotor may also be detachably coupled to the motor assembly 133 of the rotational unit 132, preferably outside the rotary seals 135. Rotors of different heights may then be provided which correspond to filter modules of different heights, each rotor having the appropriate number of rotary members 151 for the number of filter sections in the corresponding filter module. Different height heads, corresponding to the heights of the rotors and filter modules, may also be provided. This design allows modularity for the production of various heights and/or capacity machines by interchanging filter modules, rotors, and heads.

The rotational unit may be configured in other ways. For example, the members 151 may be flat or conical. As shown in FIG. 2, the members 151 may comprise solid disks fitted to the shaft 134 and interleaved with the stationary filter elements 148. Each disk 151 may have a size, a shape, and a surface contour which maximizes the ability of the fluid in the gap 191 between each disk 151 and filter plate 148 to sweep debris from the surface of the filter 162 and prevent the filter 162 from fouling. For example, as shown in FIG. 2, each disk 151 may be tapered growing narrower with increasing radius. This provides a tapered gap 191 which may help to maintain the filter 162 free of any accumulated debris. The size and shape of the gap, the configuration of the rotating disks, and the rotational speed of the disks may be manipulated to provide a predetermined shear rate along the radius of the filter elements which inhibits the accumulation of debris on the surface of the filters.

A dynamic filter assembly may generate shear by moving a fluid past a filter element through the action of a rotating member. The shear rate generated by the relative rotation of the filter element and the rotating member is typically on the order of about $10^5$ sec.$^{-1}$. In accordance with another aspect of the invention, it has been discovered that a surprisingly unexpected improvement in flux rate through the filter element can be achieved by introducing a net radial flow through the gap between the filter element and the rotating member in addition to the circulating flow established by the relative rotation of the filter element and the rotating member.

The shear rate of a net radial flow through the typically large gap of a dynamic filter assembly in the absence of any relative rotation would be expected to be relatively insignificant. Thus, the flux rate through the filter element would be expected to be largely independent of a net radial flow when the filter element and the member are rotating relative to one another. However, it has been discovered that a net radial flow can have a significant effect on flux rate.

Figure 6B:
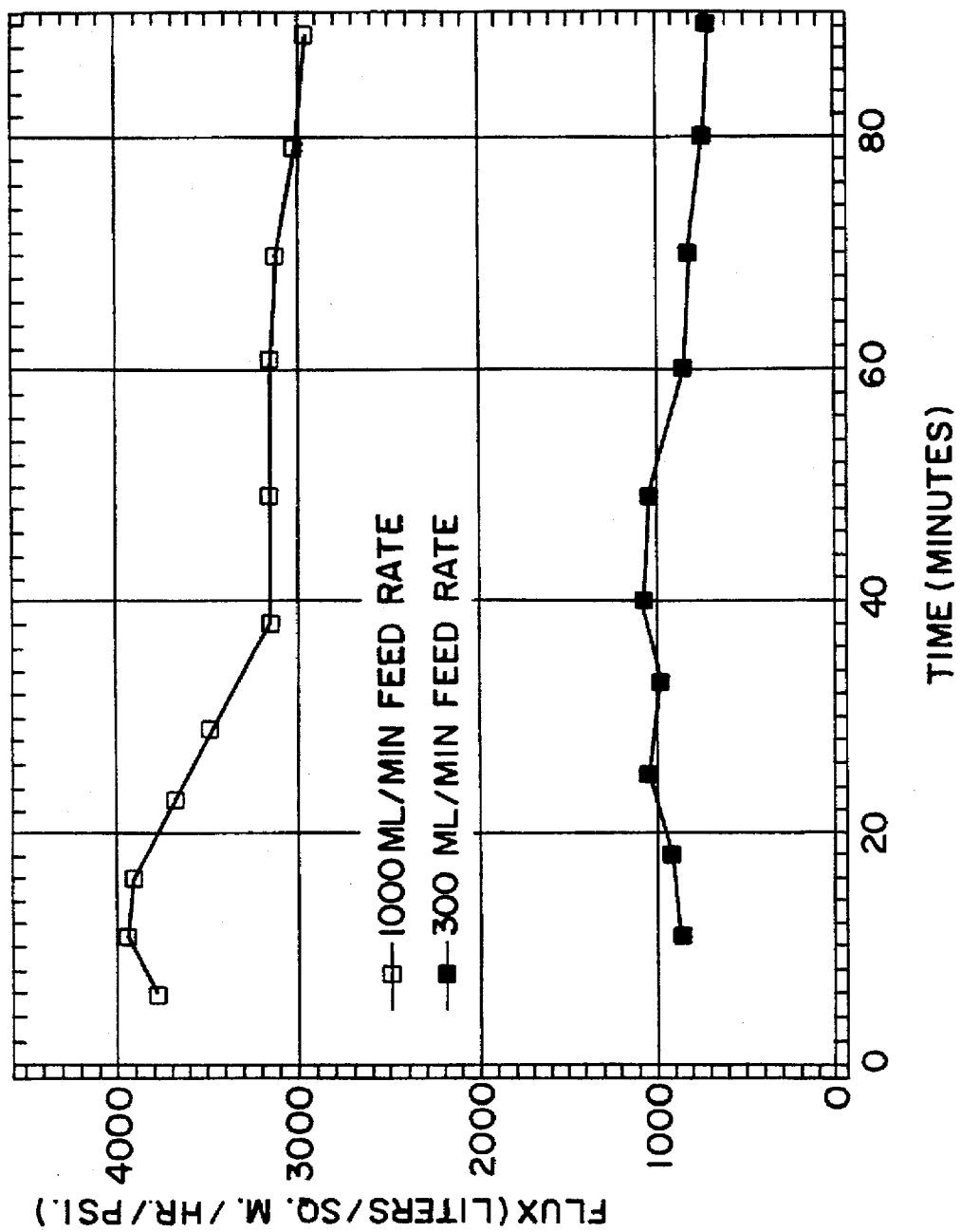
FIG. 6B is graph of flux versus time.

In one procedure, a proteinaceous water-based fluid having a protein content of about 3% by weight was fed at the rate of 300 ml/minute into a dynamic filter assembly having a single six-inch filter element equipped with a nylon 66 membrane with a 0.45 micron pore rating, such as that available from Pall Corporation under the trade designation Ultipor N66. The rotating member of the dynamic filter assembly was operated at 2200 rpm and the fluid was passed from the outside diameter to the center of the filter element and hence to the retentate outlet. The upstream pressure was maintained constant and permeate flow was monitored with time. After a few minutes, a steady flux of about 1,000 liters/sq.m./hr./bar was attained, as shown in FIG. 6B.

The initial procedure was repeated with the exception that one liter/minute of the proteinaceous water-based fluid was fed into the dynamic filter assembly. After a few minutes, a steady flux rate of about 3,000 liters/sq.m./hr./bar was attained, as shown in FIG. 6B.

Clearly, by increasing the feed rate into the dynamic filter assembly and thereby increasing the net radial flow along the membrane, a higher flux rate was achieved. This is surprising because the shear rate due to the net radial flow in the absence of relative rotation of the membrane and the rotating disk would be on the order of $10^2$ sec.$^{-1}$, which is very small in comparison to the shear rate generated by the relative rotation of the membrane and the rotating disk.

The beneficial effect of an increased net radial flow was found to extend to constant permeate operations as well. The initial procedure was again repeated except that the permeate rate was kept constant at a rate of 550 ml/minute, the feed rate for the proteinaceous water-based fluid was 1.5 liters/minute, and the transmembrane pressure was allowed to increase. The transmembrane pressure increased to the set point in approximately 40 minutes.

This constant permeate procedure was identically repeated except that the feed rate was maintained at 4.0 liters/minute. The transmembrane pressure increased to the same set point in approximately 145 minutes.

Again, increasing the feed rate through the dynamic filter assembly and thereby increasing the net radial flow across the membrane resulted in a longer time of operation before the transmembrane pressure set point was achieved and therefore resulted in a greater throughput.

Accordingly, a process feed rate in the range from about 1 to about 100 times the permeate flow rate is preferred. A process feed rate about 2 to about 30 times the permeate flow rate is more preferred. A process feed rate about 2 to about 10 times the permeate flow rate is still more preferred.

One theory which may explain the surprisingly unexpected results due to the net radial flow is that the preferred operating range for the dynamic filter assembly is the range in which a Von Karman swirling flow is produced, as discussed in *Boundary Layer Theory* by Dr. Hermann Schlichting, McGraw-Hill, 1979. This swirling flow is characterized by a bolus of fluid rotating at generally half the angular velocity of the rotating member, with boundary layers adjacent to the rotating member and the stationary filter element. This Von Karman swirling flow may be responsible for the very high shear rates which occur in the narrow boundary layers and the phenomenon itself is not significantly sensitive to the overall gap width. Any net radial flow through the gap in the presence of the Von Karman swirling flow may be forced to lie entirely in the boundary layers created by the swirling flow. Since the net radial flow is concentrated in the exceedingly narrow boundary layers, it produces an unexpectedly high shear rate which provides surprisingly beneficial effects. The net radial flow is preferably limited to a value which does not significantly distort the Von Karman swirling flow. For example, the Von Karman swirling flow may be maintained when the average velocity of the net radial flow is on the same order or smaller than the local surface velocity of the rotating member.

Figure 7:
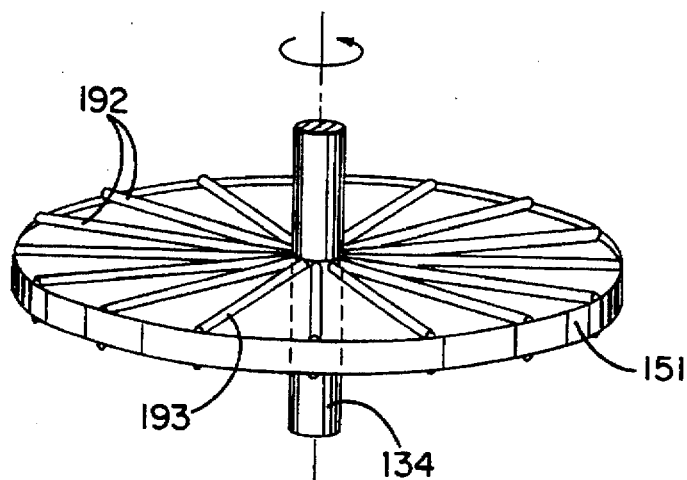
FIG. 7 is a perspective view of an embodiment of the rotational unit.
Figure 8:
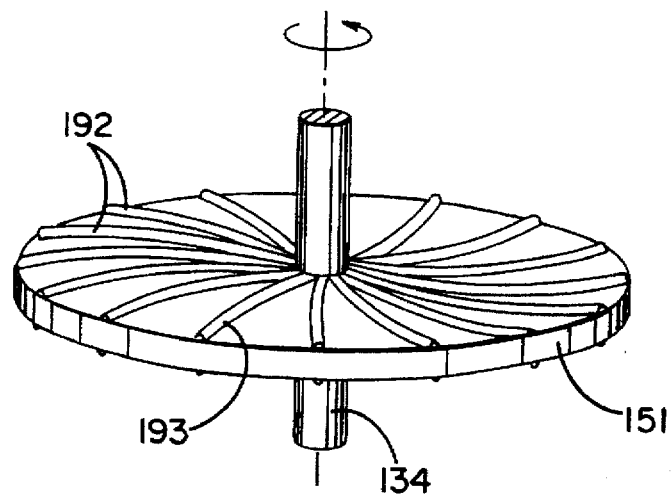
FIG. 8 is a perspective view of another embodiment of the rotational unit.

In a second embodiment of the rotational unit, the disks may have a microscopic surface roughness as well as gross surface structures, such as protrusions, recesses, or a combination of the two. For example, as shown in FIGS. 7 and 8, the rotating disks 151 may have ridges 192 or grooves 193 extending across one or both surfaces of the disk 151 from the center to the periphery. The ridges 192 or the grooves 193 may extend in a straight radial direction, as shown in FIG. 7, or in a spiral direction, as shown in FIG. 8. Further, the protrusions and recesses may include isolated bumps or dimples spread across the surface of the rotating disk.

The surface structure of the disks may produce several effects. For example, it may facilitate and/or optimize the formation of turbulent flow in the gap between the disks and the filter elements. Because the protrusions and recesses constitute "mini obstacles", small eddy currents may be formed at the boundary with the fluid. This may induce turbulent flow which, in turn, may inhibit the accumulation of debris on the surface of the filters. In addition to the embodiments shown in FIGS. 7 & 8, the members of the rotational unit may have any suitable configuration for generating turbulence in the gap between the members and the filter elements. For example, the members may be slotted or may comprise individual blades extending from the shaft.

The rotary disks also provide a pumping action due to the centrifugal forces generated by the rotating disks. The natural surface roughness of the disks drags along fluid located in the vicinity of the surfaces of the rotating disks and propels the fluid through the gaps in a spiral-like flow pattern. Any gross surface protrusions and/or recesses in the rotary disks, as shown in FIGS. 7 and 8, may further enhance the pumping action. For example, the spirals of the ridges 192 and/or the grooves 193 may provide additional pumping action by approximating the trajectory on which a fluid particle would move as it passes through the gap 35 from the center to the periphery under the combined action of centrifugal force and frictional force due to the surface of the rotating disc.

The spiral pattern of ridges 192 and/or grooves 193 will exhibit different magnitudes of pumping action depending on the direction of rotation. Usually, pumping action and turbulence are two mutually counter-productive effects. In view of this fact, the embodiment shown in FIG. 8 lends itself to at least two modes of operation. In the first mode of operation the disc is rotated in the direction where pumping action is the dominant effect while the creation of turbulence is de-emphasized. In the second mode of operation the disc is rotated in the opposite direction, thus emphasizing the creation of turbulence and making pumping action less dominant. Hence, the embodiment of FIG. 8 provides flexibility for the operation of the dynamic filter assembly. In particular, a different pumping action behavior and turbulence behavior can be achieved without changing the rotational speed of the rotating discs. This increase in flexibility of operation is achieved by a decrease in symmetry of the surface structure of the rotating disc, as one passes from the embodiment of FIG. 7 to the embodiment of FIG. 8.

Figure 9:
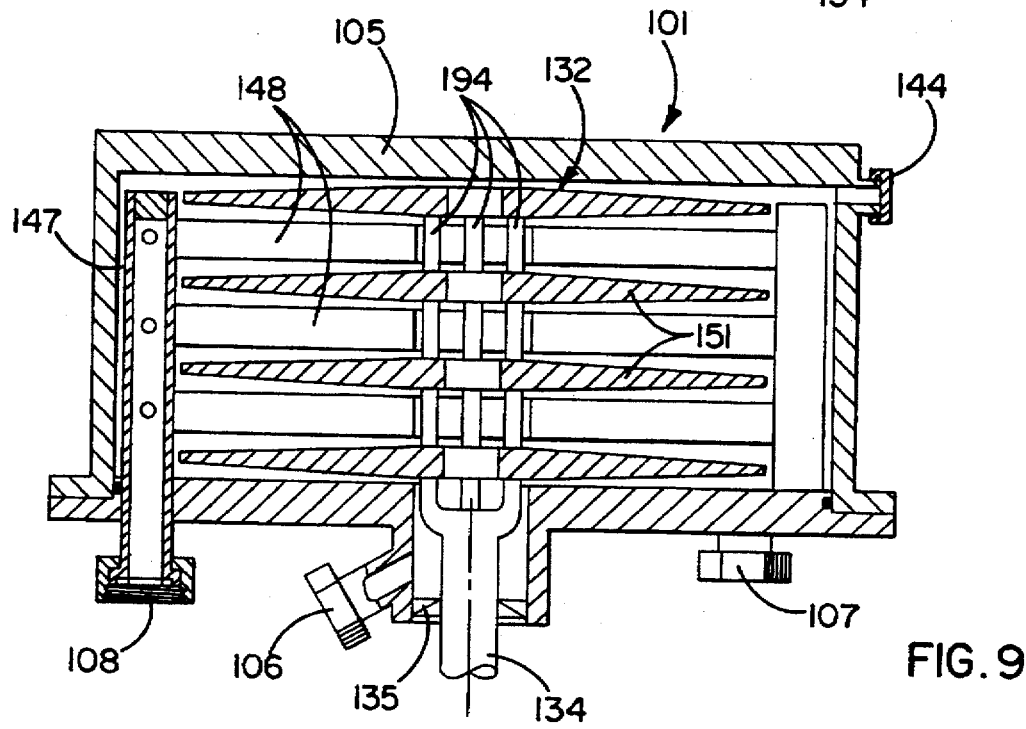
FIG. 9 is a sectioned view of another embodiment of the dynamic filter assembly.

The shaft 134 may have a variety of configurations. For example, as shown in FIG. 9, another embodiment of the dynamic filter assembly 101 includes a shaft 134 having several axially extending tines 194 to which the rotating disks are mounted. The process fluid inlet 106 is coupled to the shaft 134 at the base of the tines 194 and above a mechanical rotary seal 135. The process fluid flows axially along the tines 194 in parallel along each of the filter elements 148 of the filter unit 147 and out through the retentate outlet 107.

The shaft 134 may also be solid, or hollow. Where the shaft is solid, the rotating disk 151 may have openings near the shaft which would allow process fluid to flow axially along the shaft and provide parallel flow of the process fluid between the center and the periphery of the filter unit. Where the shaft is hollow, a passage may run axially up from the bottom or down from the top through the shaft and communicate with the interior of the housing through openings in the shaft between adjacent rotating disks. The passage in the shaft may be coupled to either the process fluid inlet or the retentate outlet to provide parallel flow of the process fluid between the center and the periphery of the filter unit.

Figure 10:
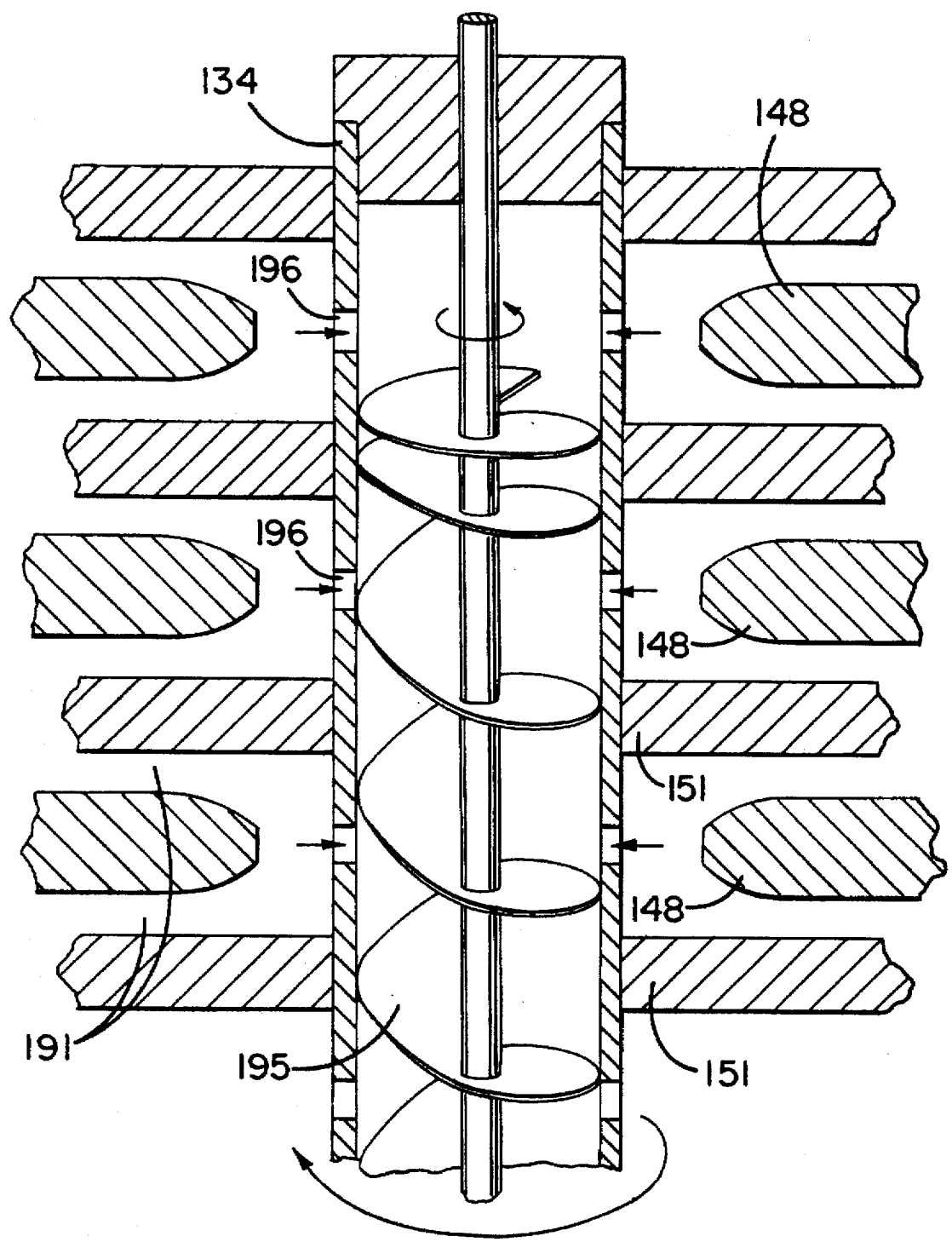
FIG. 10 is a sectional view of another embodiment of a dynamic filter assembly.

As shown in FIG. 10 a further preferred embodiment of the present invention includes a hollow shaft 134 with rotating discs 151 mounted integrally on the shaft 134. Each of these rotating discs 151 is located between two adjacent filter sectors 172 thus creating narrow gaps 191. A screw conveyor 195 with its axis concentric to the longitudinal axis of the hollow shaft 134 may be mounted integrally within the hollow shaft 134. Consequently, as the shaft 134 rotates, a pumping action is provided by the screw conveyor 195 in the hollow shaft 134. For example, process fluid may be pumped along the hollow shaft 134 and split into the plurality of narrow gaps 191 through openings 196 in the wall of the hollow shaft 134. The integrated screw conveyor 195 of FIG. 10 preferably has a decreasing pitch in the direction of fluid feed along the hollow shaft 134 in order to achieve a uniform flow pattern across each of the narrow gaps 191. Changing the preselected pitch along the rotational axis allows correspondingly preselected adjustment of pressure/flow distribution along the hollow shaft 134 and its feed openings 196.

The embodiment shown in FIG. 10 synergistically provides pumping action by rotation of both the screw conveyor 195 and the rotating discs 151. Depending on specific requirements, the screw conveyor can be mounted integrally within the hollow shaft, locking its rotation to the rotation of the rotating discs 151 or the screw conveyor may rotate independently of the hollow shaft and its rotating discs 151. Furthermore, it may be advantageous to even rotate the screw conveyor in a sense opposite to the rotation of the hollow shaft.

Figure 11:
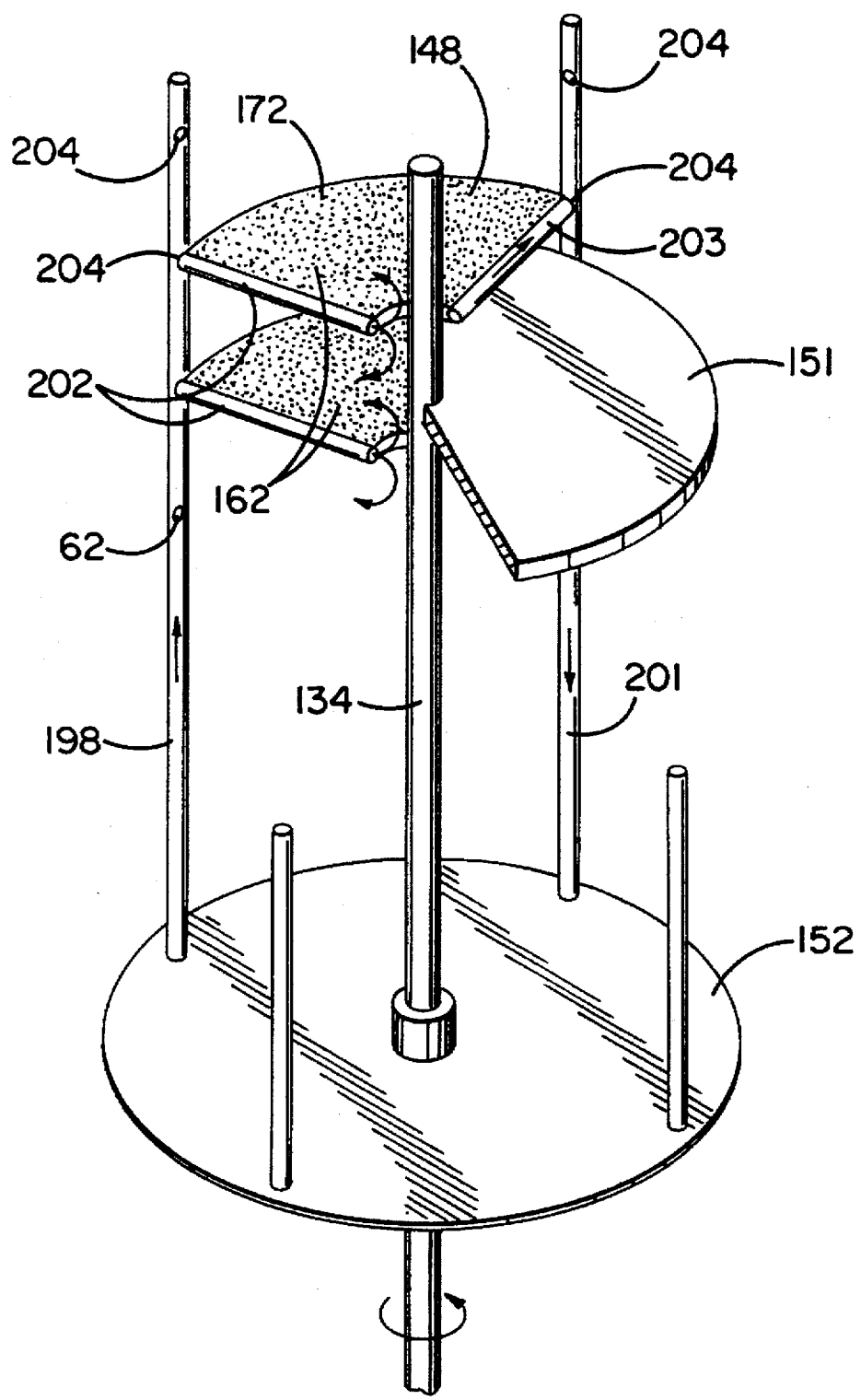
FIG. 11 is a perspective view of another embodiment of a dynamic filter assembly.

FIG. 11 shows another embodiment of the present invention. A shaft 134, which does not have to be hollow, is rotatably mounted in the base 152. Several rotating discs 151 (only one of which is shown in the figure) are integrally mounted on the shaft 151. In this embodiment each filter element 148 is composed of four filter sectors 172, each spanning about 90°. Process fluid supply means are provided as separate feed conduits 198 mounted in the base 152. Similarly, permeate discharge means are provided as separate permeate conduits 201 mounted in the base 152. In the embodiment of FIG. 11 each filter sector 172 comprises one integrated process fluid feed duct 202 and one integrated permeate duct 203. Process fluid enters the dynamic filter assembly through the process fluid inlet and continues through the process fluid feed conduits 198, where it is branched into the integrated process fluid feed ducts 202 of each filter sector 172. The process fluid moves in a radially inward direction through the integrated process fluid feed ducts 202 and is launched into the gaps 191 between adjacent filter elements 148 and rotating discs 151. The process fluid then flows in a radially outward direction within the gaps 191 and is separated into permeate and retentate as it passes over the filter of each filter sector 172. Permeate within each filter sector 172 is withdrawn through the integrated permeate duct 203 and passed through the permeate fluid conduits 201 to the permeate outlet. The retentate passes within the housing to the retentate outlet.

One advantage of this embodiment is the fact that, even though the process fluid is fed from the periphery towards the center, it is not exposed to any centrifugal force counteracting the pumping action of the rotational unit. Further, a hollow shaft with openings is not needed. A second advantage of this embodiment consists in the process fluid feed conduits and ducts 198, 202 and the permeate conduits and ducts 201, 203 serving as a support structure for the filter sectors 172. Thus, the conduits and ducts have a double function. The filter sectors 172, including the filters, the integrated process fluid feed ducts 202 and the integrated permeate ducts 203, may preferably be replaceably mounted on the support framework provided by the process fluid feed conduits 198 and the permeate conduits 202. Each filter sector 172 with its corresponding integrated ducts 202, 203 forms an independently operating unit of the filter apparatus in conjunction with each adjacent rotating disc 151. Therefore, any kind of sealing between adjacent filter sectors 172 is not needed, thus facilitating the exchange of filter sectors 172. That is, no radial seal between adjacent filter sectors is needed. The only type of seal which is desired is a small seal 204 at the junction between each integrated process fluid feed duct 202 and the corresponding process fluid feed conduit 198. Analogously, a similar seal 204 is needed between the integrated permeate duct 203 and the corresponding permeate conduit 201.

Figure 12A:
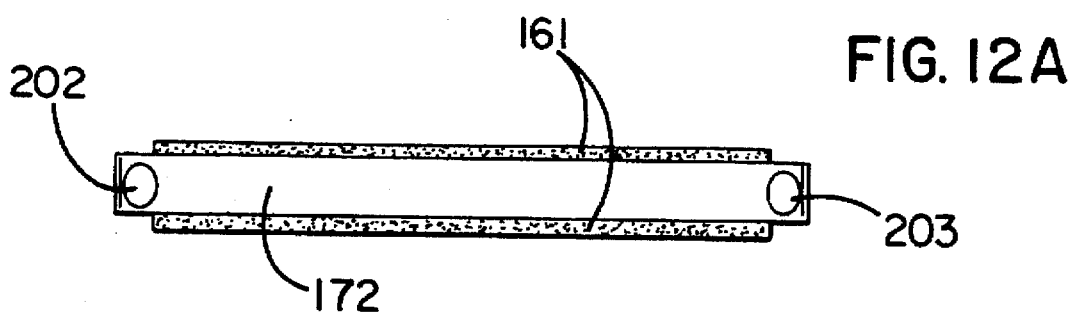
FIGS. 12A–12C are a front view, a top view, and a perspective view of a filter sector of FIG. 11.
Figure 12B:
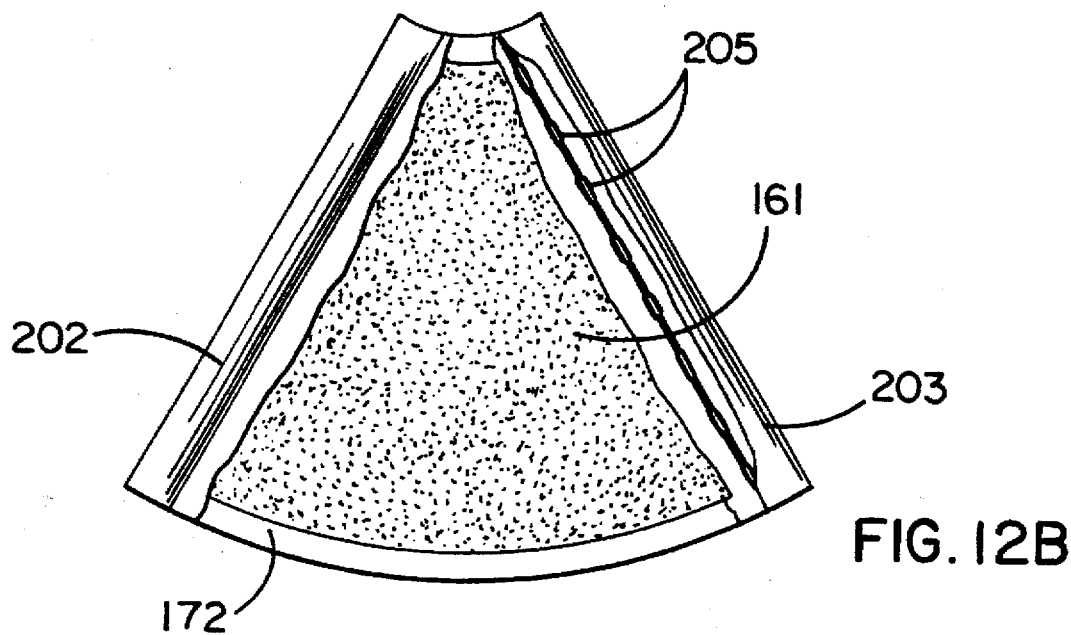
Figure 12C:
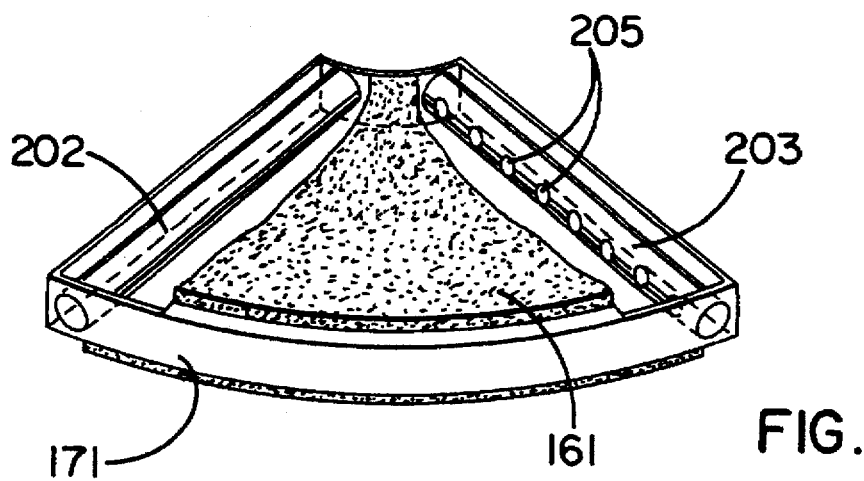

FIG. 12A shows a front view, FIG. 12B shows a top view with parts of the filter 161 removed in order to make the interior visible, and FIG. 12C shows a perspective view of a typical filter sector for the embodiment of FIG. 11 with the internal structure made visible. The filter sector 172 of this embodiment is a box with one integrated permeate duct 203 for collecting permeate from within the box and passing the permeate to the permeate conduit 201. The second integrated duct is an integrated process fluid feed duct 202. Openings 205 are provided along the length of the integrated permeate duct 203 within the filter sector 172. This filter sector, with one integrated permeate duct 203 and one integrated process fluid feed duct 202, is mounted to the conduit framework of the embodiment of FIG. 11 with the end openings in the process fluid feed duct 202 and the permeate duct 203 communicating with the process fluid feed conduit 198 and the permeate conduit 201. In this case, two 204 seals are provided at the two previously mentioned junctions. Permeate then flows from the inside of the filter sector 172 through the openings 205 into the integrated permeate duct 203 and along the integrated permeate duct 203 and the permeate conduit 201 to the permeate outlet.

Figure 13:
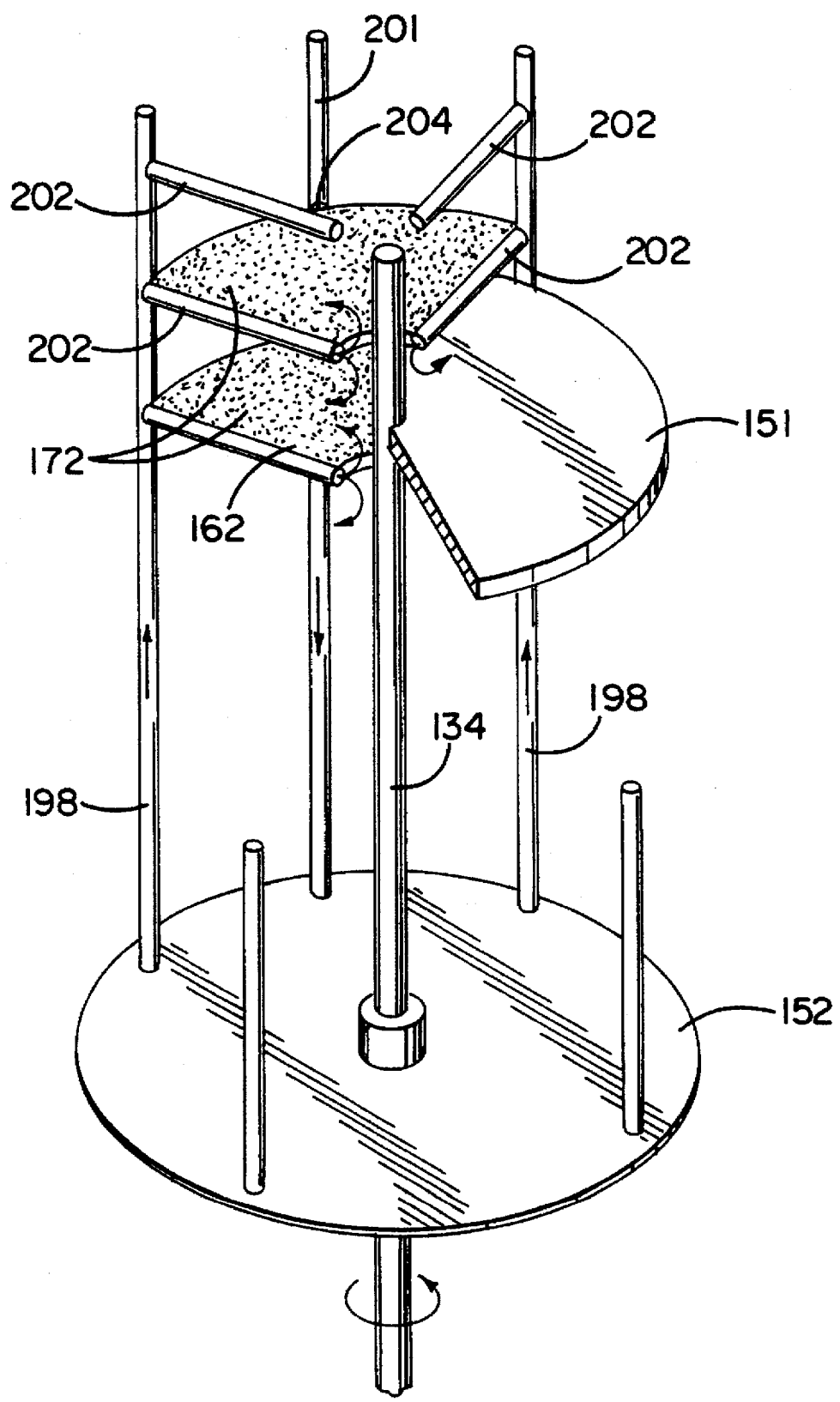
FIG. 13 is a perspective view of another embodiment of a dynamic filter assembly.

FIG. 13 shows another embodiment of the present invention. Again, a shaft 134 is rotatably mounted in the base 152. The rotating shaft 134 comprises a plurality of rotating discs 151 integrally mounted on the shaft 134. Process fluid supply means and permeate discharge means are provided as a separate framework of conduits 198, 201 mounted in the base 152. In the embodiment of FIG. 13 each filter sector 172 comprises an integrated permeate duct but the radially extending process fluid feed ducts 202 are provided separate from and adjacent to each filter sector 172. Each of these filter sectors 172 with their two filters 162 form a closed box with just one opening 206 leading from its inside into the permeate discharge conduits 201. At the junction between a filter sector 172 and the permeate discharge conduits means 201 a seal 204 is provided. Each filter sector 172 is held by a pair of separate process fluid feed ducts 202. In addition., support is provided at the junction between the filter sector 172 and the permeate conduit 201.

In this particular embodiment of FIG. 13 process fluid enters through the base 152 and passes along the process fluid feed conduits 198 from where it is branched into the separate process fluid feed ducts 202 which now serve a double function. First, they provide support for each filter sector 172. Second, they allow process fluid to flow in a radially inward direction within a non-rotating portion of the dynamic filter assembly. This way, process fluid does not have to be pumped against any centrifugal force. At the central end of each separate process fluid feed conduit 198 incoming process fluid turns around and enters the gaps 191 between the rotating discs 151 and the filter elements 148, each of which is composed of at least two filter sectors 172. The process fluid is then propelled in a radially outward direction by the rotating discs 151. Hence, pumping action is provided by which process fluid is sucked through process fluid feed conduits and ducts 198, 202. As the process fluid progresses past the filters 162 of the filter elements 148 it is continuously separated into permeate which enters the filter elements 148 and retentate which remains in the gaps 191.

The permeate then travels through the filter sectors 172 and the permeate discharge conduits 201 means to the permeate outlet, while the retentate flows through the gap 191 to the periphery of the housing and hence to the retentate outlet.

An advantage of this embodiment is its structural stability for the filter sectors 172 and, thus, the filter elements 148. In addition, the filter sectors 172 can easily be mounted and replaced in a modular way. The only seal required is a seal 204 at the junction between each filter sector 172 and the permeate conduits 201. Again, no radial seal is required, facilitating the exchange of filter sectors 172. The embodiment of FIG. 13 may also be provided with more than one permeate conduit for each filter sector 172. Further, the angular extent of each filter sector 172 can be varied considerably. In order to keep replaceability of filter sectors 172 simple, a filter sector may preferably span up to 180°, thus necessitating two filter sectors 172 to establish one filter element 148.

Figure 14A:
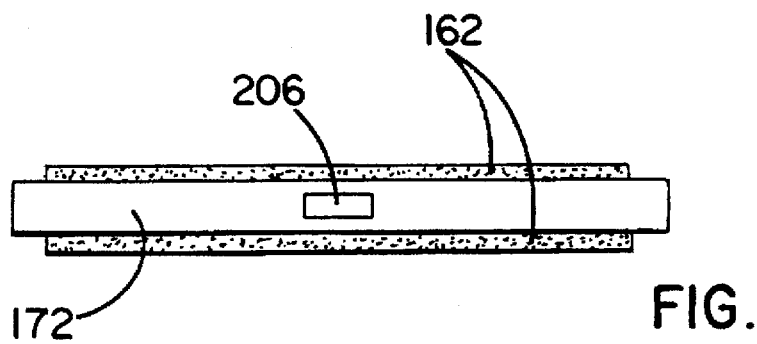
FIGS. 14A–14C are a front view, a top view, and a perspective view of a filter sector.
Figure 14B:
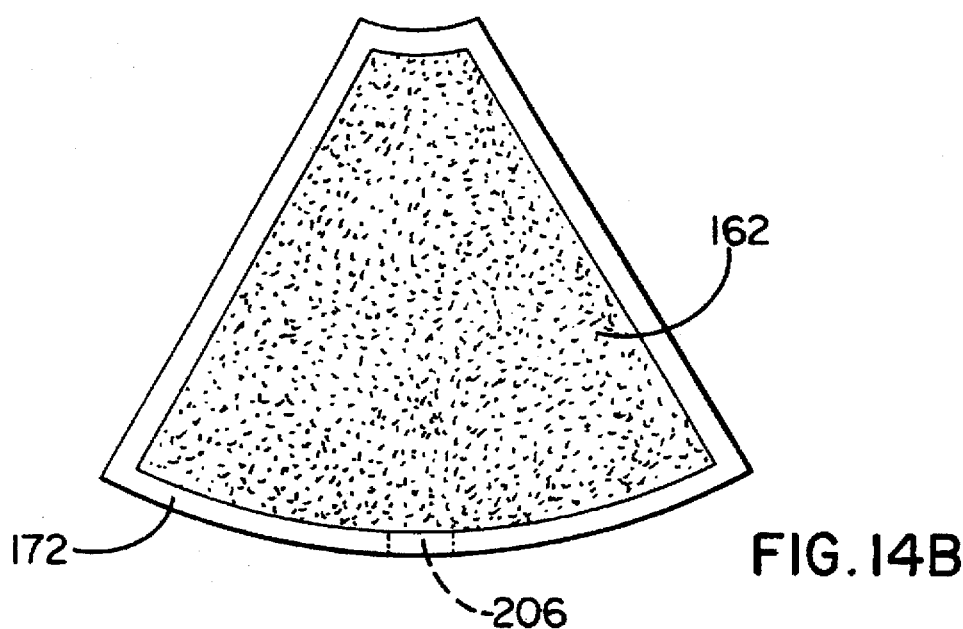
Figure 14C:
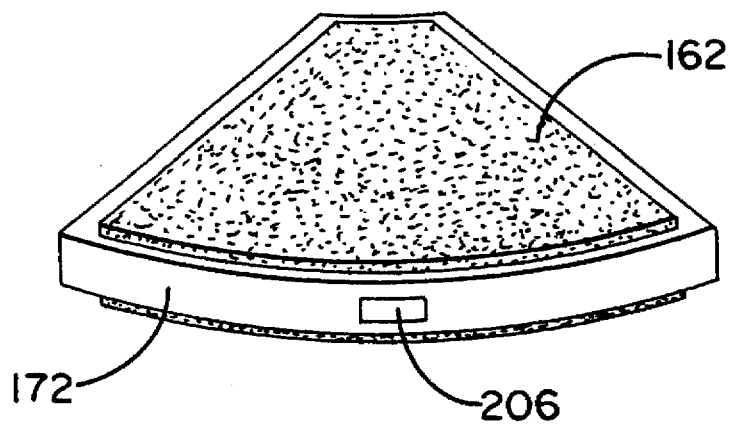

FIG. 14A shows a front view, FIG. 14B shows a top view, and FIG. 14C shows perspective view of a typical filter sector for the embodiment of FIG. 13. This is a box with at least one integrated permeate duct for collecting permeate within the box and passing the permeate to the permeate conduit 201. The vertical radial edges of the filter sector 172 may be provided with notches or grooves corresponding to grooves or notches on the outside of the separate process fluid feed ducts 202. Thus, each filter sector 172 can be registered and mounted to a support frame comprising the process fluid feed conduits and ducts 198, 202 and the permeate conduits 201.

Figure 15:
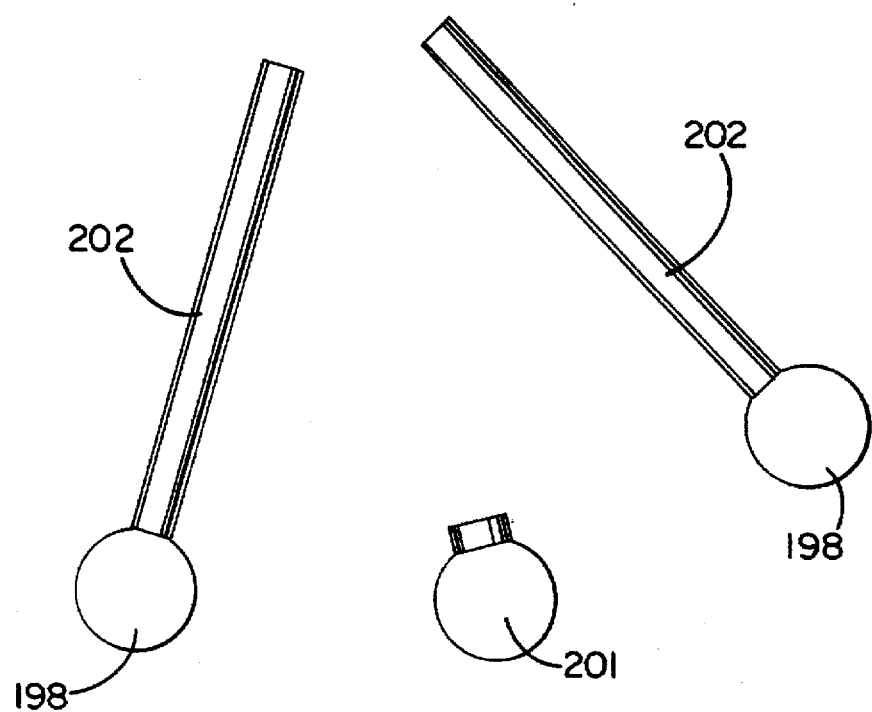
FIG. 15 is a top view of the embodiment of FIG. 13 without the filter sectors in place.

FIG. 15 is a top plan view of a portion of the embodiment of FIG. 13. The vertical permeate conduits 201 and process fluid feed conduits 198 are shown in cross section. The radially extending separate process fluid feed ducts 202 are connected to each process fluid feed conduit 198. A filter sector is not shown.

Figure 16:
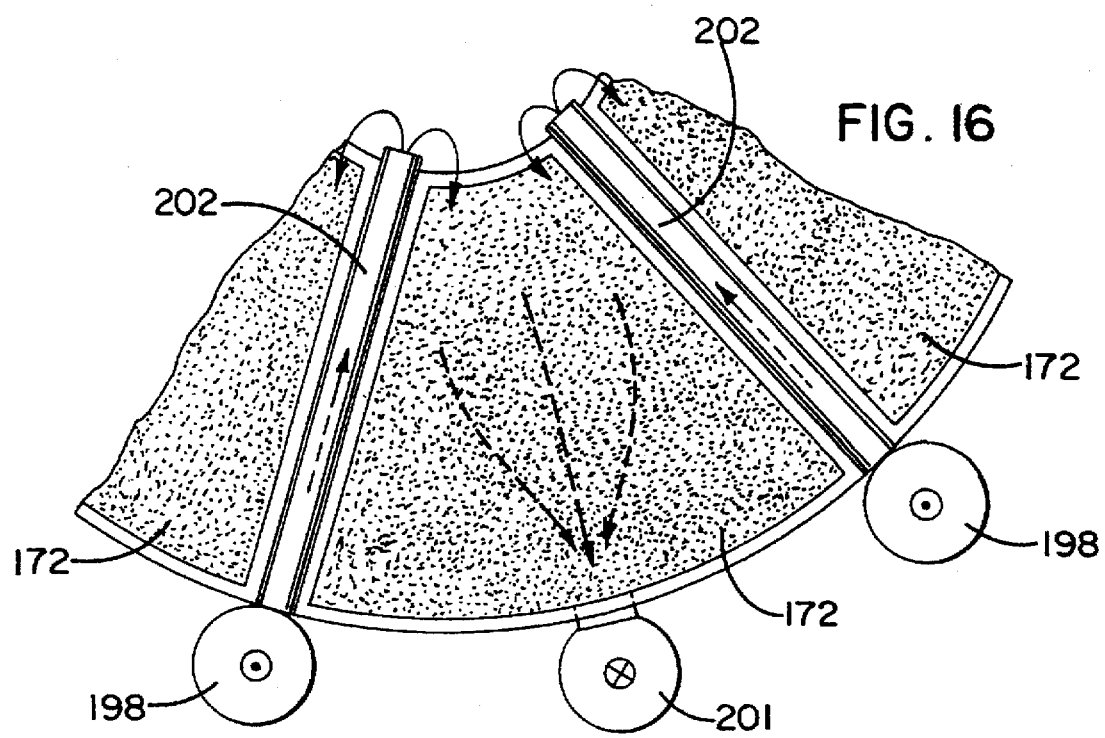
FIG. 16 is a top view of the embodiment of FIG. 13 with the filter sectors in place.

FIG. 16 shows the same portion of the same embodiment as FIG. 15. Now a filter sector 172 is shown. The flow pattern is indicated by arrows and small circles. A circle with a dot indicates upward flow and a circle with a cross indicates downward flow. It can be seen that process fluid moves in an upward direction through process fluid feed conduits 198 to be branched into the radially extending separate process fluid feed ducts 202. From these separate process fluid ducts 202, process fluid enters the gap 191 between filter elements 148 and the rotating discs 151. Permeate flow within each filter sector 172 is indicated by dotted arrows in a direction from the center to the periphery of the filter sector 172, where it flows through the integrated permeate duct 203 and passes to the permeate conduits 201.

While the invention has been described in some detail by way of illustration, the invention is amenable to various modifications and alternative forms, and is not restricted to the specific embodiments set forth. These specific embodiments are not intended to limit the invention but, on the contrary, the intention is to cover all modifications, equivalents, and alternatives falling within the spirit and scope of the invention.

We claim:

1. A dynamic filter assembly comprising:
   a housing having a base, a process fluid inlet, and a permeate outlet;
   a stationary filter unit disposed within the housing and including a plurality of stacked filter elements, each filter element including a pair of opposed major surfaces, a peripheral edge bounding the major surfaces, a permeate passage, and a filter medium disposed on at least one of the major surfaces, each filter medium having an upstream side fluidly coupled to the process fluid inlet and a downstream side fluidly coupled to the permeate passage, wherein one of the major surfaces of one of the filter elements is generally parallel to one of the major surfaces of another of the filter elements, the filter unit further including a plurality of posts coupled to the housing and the filter elements to secure the filter elements to the base of the housing, wherein at least a first post includes a plurality of spacers respectively disposed between the major surfaces of the filter elements to space the filter elements apart from one another, the spacers supporting the filter elements at a location radially inwardly of the peripheral edges of the filter elements, and a bore extending transversely through the major surfaces of the plurality of filter elements and the plurality of spacers, the bore fluidly communicating between the permeate passage of each filter element and the permeate outlet;

a connector extending transversely of the base and the first post to secure the filter unit against the base; and a member disposed within the housing facing the filter medium of at least one of the filter elements, the member being arranged to rotate relative to the filter medium to prevent fouling of the filter medium.

2. The dynamic filter assembly of claim 1 wherein the filter unit is removably mounted on the base and the bore is sealed to the permeate outlet, wherein the dynamic filter assembly further comprises a rotary unit including a rotatable shaft extending into the housing and a plurality of members, including the member, mounted to the shaft, wherein each member comprises a disk, and wherein the disks are interleaved between the plurality of stacked filter elements and define a gap between each disk and an adjacent filter medium, whereby process fluid introduced into the housing through the process fluid inlet passes into the gaps between the filter media and the rotating disks and permeate passes through the filter media along the permeate passages of the filter elements to the bore in the first post and out of the housing through the permeate outlet.

3. The dynamic filter assembly of claim 2 wherein the shaft extends vertically within the housing.

4. The dynamic filter assembly of claim 3 wherein the shaft extends into the housing from the base.

5. The dynamic filter assembly of claim 2 wherein the shaft and the discs comprise a unitary structure free of crevices.

6. The dynamic filter assembly of claim 5 wherein the shaft extends vertically from the base into the housing.

7. The dynamic filter assembly of claim 1 wherein the plurality of posts further includes second and third generally diametrically opposed posts coupled to the stacked filter elements.

8. The dynamic filter assembly of claim 7 wherein the second and third posts support each filter element inwardly of the peripheral edge of the filter element.

9. The dynamic filter assembly of claim 8 wherein the second and third posts each have a cross-sectional shape comprising a central region and first and second tapering ends extending from the central region, the tapering ends of each of the second and third posts being oriented to reduce drag on process fluid swirling within the housing.

10. The dynamic filter assembly of claim 7 wherein each of the second and third posts includes a plurality of slots, the filter elements being positioned in the slots of the second and third posts.

11. The dynamic filter assembly of claim 10 wherein the slots of the second and third posts support the filter elements inwardly of the peripheral edges of the filter elements.

12. The dynamic filter assembly of claim 11 wherein the plurality of posts are coupled to the filter elements and the housing to restrain the filter elements axially and allow the filter elements to expand and contract in a radial plane.

13. The dynamic filter assembly of claim 12 wherein the filter unit is removably mounted on the base and the bore is sealed to the permeate outlet, wherein the dynamic filter assembly further comprises a rotary unit including a rotatable shaft extending vertically from the base into the housing and a plurality of members, including the member, mounted to the shaft, wherein each member comprises a disk, wherein the shaft and the plurality of disks comprise a unitary structure free of crevices, and wherein the disks are interleaved between the plurality of stacked filter elements and define a gap between each disk and an adjacent filter medium, whereby process fluid introduced into the housing through the process fluid inlet passes into the gaps between the filter media and the rotating disks and permeate passes through the filter media along the permeate passages of the filter elements to the bore of the first post and out of the housing through the permeate outlet.

14. The dynamic filter assembly of claim 7 wherein each of the second and third posts has a cross section comprising a central region and first and second tapering ends extending from the central region, the tapering ends of each of the second and third posts being oriented to reduce drag on process fluid swirling within the housing.

15. The dynamic filter assembly of claim 14 wherein each of the second and third posts includes a plurality of slots, the filter elements being positioned in the slots of the second and third posts.

16. The dynamic filter assembly of claim 15 wherein the plurality of posts are coupled to the filter elements and the housing to restrain the filter elements axially and allow the filter elements to expand and contract in a radial plane.

17. The dynamic filter assembly of claim 16 wherein the filter unit is removably mounted on the base and the base is sealed to the permeate outlet, wherein the dynamic filter assembly further comprises a rotary unit including a rotatable shaft extending vertically from the base into the housing and a plurality of members, including the member, mounted to the shaft, wherein each member comprises a disk, wherein the shaft and the plurality of disks comprise a unitary structure free of crevices, and wherein the disks are interleaved between the plurality of stacked filter elements and define a gap between each disk and an adjacent filter medium, whereby process fluid introduced into the housing through the process fluid inlet passes into the gaps between the filter media and the rotating disks and permeate passes through the filter media along the permeate passages of the filter elements to the bore of the first post and out of the housing through the permeate outlet.

18. The dynamic filter assembly of claim 14 wherein the plurality of posts are coupled to the filter elements and the housing to restrain the filter elements axially and allow the filter elements to expand and contract in a radial plane.

19. The dynamic filter assembly of claim 18 wherein the second and third posts support the filter elements inwardly of the peripheral edges of the filter elements.

20. The dynamic filter assembly of claim 19 wherein the filter unit is removably mounted on the base and the bore is sealed to the permeate outlet, wherein the dynamic filter assembly further comprises a rotary unit including a rotatable shaft extending vertically from the base into the housing and a plurality of members, including the member, mounted to the shaft, wherein each member comprises a disk, wherein the shaft and the plurality of disks comprise a unitary structure free of crevices, and wherein the disks are interleaved between the plurality of stacked filter elements and define a gap between each disk and an adjacent filter medium, whereby process fluid introduced into the housing through the process fluid inlet passes into the gaps between the filter media and the rotating disks and permeate passes through the filter media along the permeate passages of the filter elements to the bore of the first post and out of the housing through the permeate outlet.

21. The dynamic filter assembly of claim 1 wherein the first post has a cross sectional shape comprising a central region and first and second tapering ends extending from the central region, the tapering ends of the first post being oriented to reduce drag on process fluid swirling within the housing.

22. The dynamic filter assembly of claim 21 wherein the plurality of posts includes a second post having a cross sectional shape which comprises a central region and first and second tapering ends extending from the central region, the tapering ends of the second post being oriented to reduce drag on process fluid swirling within the housing.

23. The dynamic filter assembly of claim 22 wherein each of the plurality of posts has a cross sectional shape comprising a central region and first and second tapering ends extending from the central region, the tapering ends of each post being oriented to reduce drag on process fluid swirling within the housing.

24. The dynamic filter assembly of claim 1 wherein the posts are coupled to the housing and the filter elements to restrain the filter elements axially and allow the filter elements to expand and contract in a radial plane.

25. The dynamic filter assembly of claim 24 wherein the first post has a cross sectional shape comprising a central region and first and second tapering ends extending from the central region, the tapering ends of the first post being oriented to reduce drag on process fluid swirling within the housing.

26. The dynamic filter assembly of claim 25 wherein each of the plurality of posts support the filter elements inwardly of the peripheral edges of the filter elements.

27. The dynamic filter assembly of claim 25 wherein the plurality of posts includes a second post having a cross sectional shape which comprises a central region and first and second tapering ends extending from the central region, the tapering ends of each post being oriented to reduce drag on process fluids swirling within the housing.

28. The dynamic filter assembly of claim 27 wherein each of the plurality of posts support the filter elements inwardly of the peripheral edges of the filter elements.

29. The dynamic filter assembly of claim 28 wherein the filter unit is removably mounted on the base and the bore is sealed to the permeate outlet, wherein the dynamic filter assembly further comprises a rotary unit including a rotatable shaft extending vertically from the base into the housing and a plurality of members, including the member, mounted to the shaft, wherein each member comprises a disk, wherein the shaft and the plurality of disks comprise a unitary structure free of crevices, and wherein the disks are interleaved between the plurality of stacked filter elements and define a gap between each disk and an adjacent filter medium, whereby process fluid introduced into the housing through the process fluid inlet passes into the gaps between the filter media and the rotating disks and permeate passes through the filter media along the permeate passages of the filter elements to the bore of the first post and out of the housing through the permeate outlet.

30. The dynamic filter assembly of claim 1 wherein the plurality of spacers includes a first spacer having a cross sectional shape comprising a central region and first and second tapering ends extending from the central region, the tapering ends of the first spacer being oriented to reduce drag on process fluids swirling within the housing.

31. The dynamic filter assembly of claim 30 wherein the plurality of spacers include a second spacer having a cross sectional shape comprising a central region and first and second tapering ends extending from the central region, the tapering ends of the second spacer being oriented to reduce drag on process fluids swirling within the housing.

32. The dynamic filter assembly of claim 31 wherein the plurality of posts further includes second and third generally diametrically opposed posts coupled to the stacked filter elements and supporting each filter element inwardly of the peripheral edge of the filter element.

33. The dynamic filter assembly of claim 32 wherein the second and third posts each have a cross-sectional shape comprising a central region and first and second tapering ends extending from the central region, the tapering ends of each of the second and third posts being oriented to reduce drag on process fluid swirling within the housing.

34. The dynamic filter assembly of claim 33 wherein the filter unit is removably mounted on the base and the bore is sealed to the permeate outlet, wherein the dynamic filter assembly further comprises a rotary unit including a rotatable shaft extending vertically from the base into the housing and a plurality of members, including the member, mounted to the shaft, wherein each member comprises a disk, wherein the shaft and the plurality of disks comprise a unitary structure free of crevices, and wherein the disks are interleaved between the plurality of stacked filter elements and define a gap between each disk and an adjacent filter medium, whereby process fluid introduced into the housing through the process fluid inlet passes into the gaps between the filter media and the rotating disks and permeate passes through the filter media along the permeate passages of the filter elements to the bore of the first post and out of the housing through the permeate outlet.

35. The dynamic filter assembly of claim 32 wherein the plurality of posts are coupled to the filter elements and the housing to restrain the filter elements axially and allow the filter elements to expand and contract in a radial plane.

36. The dynamic filter assembly of claim 35 wherein the second and third posts each have a cross-sectional shape comprising a central region and first and second tapering ends extending from the central region, the tapering ends of each of the second and third posts being oriented to reduce drag on process fluid swirling within the housing.

37. The dynamic filter assembly of claim 36 wherein the filter unit is removably mounted on the base and the bore is sealed to the permeate outlet, wherein the dynamic filter assembly further comprises a rotary unit including a rotatable shaft extending vertically from the base into the housing and a plurality of members, including the member, mounted to the shaft, wherein each member comprises a disk, wherein the shaft and the plurality of disks comprise a unitary structure free of crevices, and wherein the disks are interleaved between the plurality of stacked filter elements and define a gap between each disk and an adjacent filter medium, whereby process fluid introduced into the housing through the process fluid inlet passes into the gaps between the filter media and the rotating disks and permeate passes through the filter media along the permeate passages of the filter elements to the bore of the first post and out of the housing through the permeate outlet.

38. The dynamic filter assembly of claim 1 wherein said spacer and a said filter element adjacent thereto together comprise a unitary structure.

39. The dynamic filter assembly of claim 38 wherein the spacer comprises a metallic material and the filter element comprises a metallic material.

40. The dynamic filter assembly of claim 38 wherein the spacer comprises a polymeric material and the filter element comprises a polymeric material.

41. The dynamic filter assembly of claim 38 wherein the plurality of spacers includes first and second spacers each having a cross sectional shape comprising a central region and first and second tapering ends extending from the central region, the tapering ends of each of the first and second spacers being oriented to reduce drag on process fluids swirling within the housing.

42. The dynamic filter assembly of claim 41 wherein the plurality of posts further includes second and third generally diametrically opposed posts coupled to the stacked filter elements and supporting each filter element inwardly of the peripheral edge of the filter element, each of the second and third posts having a cross sectional shape comprising a central region and first and second tapering ends extending from the central region, the tapering ends being oriented to reduce drag on process fluids swirling within the housing.

43. The dynamic filter assembly of claim 38 wherein the plurality of posts are coupled to the filter elements and the housing to restrain the filter elements axially and allow the filter elements to expand and contract in a radial plane.

44. The dynamic filter assembly of claim 43 wherein the filter unit is removably mounted on the base and the bore is sealed to the permeate outlet, wherein the dynamic filter assembly further comprises a rotary unit including a rotatable shaft extending vertically from the base into the housing and a plurality of members, including the member, mounted to the shaft, wherein each member comprises a disk, and wherein the disks are interleaved between the plurality of stacked filter elements and define a gap between each disk and an adjacent filter medium, whereby process fluid introduced into the housing through the process fluid inlet passes into the gaps between the filter media and the rotating disks and permeate passes through the filter media along the permeate passages of the filter elements to the bore of the first post and out of the housing through the permeate outlet.

45. The dynamic filter assembly of claim 1 wherein a said spacer and a said filter element adjacent thereto comprise separate pieces sealed to one another.

46. The dynamic filter assembly of claim 45 wherein the spacer comprises a metallic material and the filter element comprises a metallic material.

47. The dynamic filter assembly of claim 45 wherein the spacer comprises a polymeric material and the filter element comprises a polymeric material.

48. The dynamic filter assembly of claim 47 wherein the spacer has a lower coefficient of expansion than the filter element.

49. The dynamic filter assembly of claim 45 wherein one of a spacer and a said filter element adjacent thereto comprises a metallic material and the other comprises a polymeric material.

50. The dynamic filter assembly of claim 45 further comprising a sealing member cooperatively arranged to seal a said spacer and a said filter element thereto.

51. The dynamic filter assembly of claim 50 wherein the plurality of spacers includes a first spacer having a cross-sectional shape comprising a central region and first and second tapering ends extending from the central region, the tapering ends of the first spacer being oriented to reduce drag on process fluids swirling within the housing, and wherein the sealing member has a cross sectional shape comprising a central region and first and second tapering ends extending from the central region, the sealing member being coupled to the first spacer with the central region and first and second tapering ends of the sealing member being aligned with the central region and first and second tapering ends of the first spacer.

52. The dynamic filter assembly of claim 45 further comprising a second connector extending through the plurality of spacers and filter elements to secure them.

53. The dynamic filter assembly of claim 52 further comprising a sealing member cooperatively arranged to seal a said spacer and a said filter element thereto.

54. The dynamic filter assembly of claim 53 further comprising a third connector extending through and securing the plurality of spacers and filter elements, the second and third connectors extending along opposite sides of the bore.

55. The dynamic filter assembly of claim 53 wherein the plurality of posts further includes second and third generally diametrically opposed posts coupled to the stacked filter elements and supporting each filter element inwardly of the peripheral edge of the filter element.

56. The dynamic filter assembly of claim 55 wherein the plurality of posts are coupled to the filter elements and the housing to restrain the filter elements axially and allow the filter elements to expand and contract in a radial plane.

57. The dynamic filter assembly of claim 56 wherein each of the first, second and third posts has a cross sectional shape comprising a central region and first and second tapering ends extending from the central region, the tapering ends of each of the first, second, and third posts being oriented to reduce drag on process fluids swirling within the housing.

58. The dynamic filter assembly of claim 56 wherein the filter unit is removably mounted on the base and the bore is sealed to the permeate outlet, wherein the dynamic filter assembly further comprises a rotary unit including a rotatable shaft extending vertically from the base into the housing and a plurality of members, including the member, mounted to the shaft, wherein each member comprises a disk, wherein the shaft and the plurality of disks comprise a unitary structure free of crevices, and wherein the disks are interleaved between the plurality of stacked filter elements and define a gap between each disk and an adjacent filter medium, whereby process fluid introduced into the housing through the process fluid inlet passes into the gaps between the filter media and the rotating disks and permeate passes through the filter media along the permeate passages of the filter elements to the bore of the first post and out of the housing through the permeate outlet.

59. The dynamic filter assembly of claim 1 wherein a spacer has a lower coefficient of expansion than an adjacent filter element.

60. The dynamic filter assembly of claim 1 further comprising a second connector extending through and securing the plurality of spacers and filter elements.

61. The dynamic filter assembly of claim 60 further comprising a third connector extending through and securing the plurality of spacers and filter elements, the second and third connectors extending along opposite sides of the bore.

62. The dynamic filter assembly of claim 1 wherein the filter unit includes first and second filter modules, wherein the first filter module includes the first post and the plurality of stacked filter elements, each of the filter elements comprising a filter sector, and wherein the second filter module includes a second post and a plurality of stacked filter sectors coupled to the second post, each filter sector including a pair of opposed major surfaces, a peripheral edge bounding the major surfaces, a permeate passage, and a filter medium disposed on at least one of the major surfaces, each filter medium having an upstream side fluidly coupled to the process fluid inlet and a downstream side fluidly communicating with the permeate outlet.

63. The dynamic filter assembly of claim 62 wherein the filter sectors of the first filter module are respectively disposed coplanar with the filter sectors of the second filter module.

64. The dynamic filter assembly of claim 63 wherein each of the filter sectors of the first and second filter modules span an angle in the range from about 15° to about 180°.

65. The dynamic filter assembly of claim 63 wherein each of the first and second posts has a cross sectional shape comprising a central region and first and second tapering ends extending from the central region, the tapering ends of each of the first and second posts being oriented to reduce drag on process fluids swirling within the housing.

66. The dynamic filter assembly of claim 63 wherein the second post includes a plurality of spacers respectively disposed between the filter sectors of the second filter module to space the filter sectors of the second filter module apart from one another, the spacers supporting the filter sectors at a location radially inwardly of the peripheral edges of the filter sectors.

67. The dynamic filter assembly of claim 66 wherein a said spacer and a said filter sector adjacent thereto of the first filter module together comprise a unitary structure and wherein a said spacer and a said filter sector adjacent thereto of the second filter module together comprise a unitary structure.

68. The dynamic filter assembly of claim 67 wherein the spacers of the first and second posts each have a cross sectional shape comprising a central region and first and second tapering ends extending from the central region, the tapering ends of each spacer being oriented to reduce drag on process fluid swirling within the housing.

69. The dynamic filter assembly of claim 66 wherein a said spacer and a said filter sector adjacent thereto of the first module comprise separate pieces sealed to one another and wherein a said spacer and a said filter sector adjacent thereto of the second filter module comprise separate pieces sealed to one another.

70. The dynamic filter assembly of claim 69 wherein the spacers of the first and second posts each have a cross sectional shape comprising a central region and first and second tapering ends extending from the central region, the tapering ends of each spacer being oriented to reduce drag on process fluid swirling within the housing.

71. The dynamic filter assembly of claim 63 wherein the first post is coupled to the housing and the filter sectors of the first filter module to axially restrain the filter sectors of the first filter module and allow the filter sectors of the first filter module to expand and contract in a radial plane and wherein the second post is coupled to the housing and the filter sectors of the second filter module to axially restrain the filter sectors of the second filter module and allow the filter sectors of second filter modules to expand and contract in a radial plane.

72. The dynamic filter assembly of claim 62 wherein the permeate outlet comprises first and second permeate outlets disposed in the base, wherein the first filter module is mounted on the base and the bore of the first post is sealed to the first permeate outlet, and wherein the second filter module is mounted on the base, the second post of the second filter module including a permeate duct fluidly coupled between the permeate passage of each filter sector of the second filter module and the second permeate outlet.

73. The dynamic filter assembly of claim 72 further comprising a rotary unit including a rotatable shaft extending vertically into the housing and a plurality of members, including the member, mounted to the shaft, wherein each member comprises a disk, wherein the disks are interleaved between the plurality of stacked filter elements and define a gap between each disk and an adjacent filter medium, wherein the housing includes a head removably mounted to the base, and wherein the first and second filter modules are removably mounted to the base, whereby the head can be removed and the filter modules can be inserted or removed by sliding them radially with respect to the shaft.

74. The dynamic filter assembly of claim 72 wherein the plurality of posts include third and fourth generally diagonally opposed posts, wherein each of the filter sectors of the first filter module has a generally D-shaped configuration including opposite peripheral portions coupled to the third and fourth posts.

75. The dynamic filter assembly of claim 74 wherein each of the filter sectors of the second filter module has a generally D-shaped configuration including opposite peripheral portions coupled to the third and fourth posts.

76. The dynamic filter assembly of claim 75 wherein the filter sectors of the first filter module are respectively disposed coplanar with the filter sectors of the second filter module.

77. The dynamic filter assembly of claim 70 wherein the first, second, third, and fourth posts each have a cross sectional shape comprising a central region and first and second tapering ends extending from the central region, the tapering ends of each post being oriented to reduce drag on process fluid swirling within the housing.

78. The dynamic filter assembly of claim 76 wherein the first, third and fourth posts are coupled to the housing and the filter sectors of the first filter module to axially restrain the filter sectors of the first filter module and allow the filter sectors of the first filter module to expand and contract in a radial plane and wherein the second, third and fourth posts are coupled to the housing and the filter sectors of the second filter module to axially restrain the filter sectors of the second filter module and allow the filter sectors of the second filter module to expand and contract in a radial plane.

79. The dynamic filter assembly of claim 72 wherein the second post includes a plurality of spacers respectively disposed between the filter sectors to space the filter sectors apart from one another, the spacers supporting the filter sectors at a location radially inwardly of the peripheral edges of the filter sectors, and wherein the permeate duct comprises a bore extending transversely through the plurality of filter sectors and the plurality of spacers and being sealed to the second permeate outlet.

80. The dynamic filter assembly of claim 79 wherein the plurality of posts further includes third and four generally diametrically opposed posts, each of the third and fourth posts including a plurality of slots, wherein the filter sectors of the first and second filter modules each have a generally D-shaped configuration including opposite peripheral portions, and wherein the opposite peripheral portions of the filter sectors of the first and second filter modules are disposed in the slots of the third and fourth posts, the filter sectors of the first filter module being respectively disposed coplanar with the filter sectors of the second filter module.

81. The dynamic filter assembly of claim 80 wherein each of the first, second, third, and fourth posts has a cross sectional shape comprising a central region and first and second tapered ends extending from the central region, the tapered ends of each post being oriented to reduce drag on process fluid swirling within the housing, wherein the dynamic filter assembly further comprises a rotary unit including a rotatable shaft extending vertically from the base into the housing and a plurality of members, including the member, mounted to the shaft, wherein each member comprises a disk, the disks being interleaved between the plurality of stacked filter sectors to define a gap between each disk and an adjacent filter medium, whereby process fluid introduced into the housing through the process fluid inlet passes into the gaps between the filter media and the rotating disks and permeate passes through the filter media along the permeate passages of the filter sectors to the bores of the first and second posts and out of the housing through the first and second permeate outlets, and wherein the housing includes a head removably mounted to the base and the first and second filter modules are removably mounted to the base, whereby the head can be removed from the base and each of the first and second filter modules can be removed or inserted by sliding the filter module radially with respect to the shaft.

* * * * *